(12) United States Patent
Tanabe et al.

(10) Patent No.: US 8,189,223 B2
(45) Date of Patent: May 29, 2012

(54) IMAGE PROCESSING APPARATUS

(75) Inventors: Kazuhide Tanabe, Kanagawa (JP); Tadashi Nagata, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 858 days.

(21) Appl. No.: 12/255,897

(22) Filed: Oct. 22, 2008

(65) Prior Publication Data
US 2009/0109474 A1 Apr. 30, 2009

(30) Foreign Application Priority Data

Oct. 24, 2007 (JP) .................................. 2007-276729

(51) Int. Cl.
*G06F 3/12* (2006.01)

(52) U.S. Cl. ....... 358/1.15; 358/442; 358/448; 382/260; 382/254; 345/617

(58) Field of Classification Search ................. 358/1.15, 358/442, 474, 1.13, 1.16, 448; 382/260, 382/254, 261, 232, 240; 345/617
See application file for complete search history.

(56) References Cited

U.S. PATENT DOCUMENTS

| | | | | |
|---|---|---|---|---|
| 4,194,221 A * | 3/1980 | Stoffel | .......................... | 358/3.08 |
| 4,630,125 A * | 12/1986 | Roetling | ....................... | 358/3.08 |
| 4,841,377 A * | 6/1989 | Hiratsuka et al. | ............ | 358/3.08 |
| 4,908,644 A * | 3/1990 | Shindo et al. | ................. | 708/315 |
| 5,027,078 A * | 6/1991 | Fan | .............................. | 358/3.08 |
| 5,243,444 A * | 9/1993 | Fan | .............................. | 358/3.08 |
| 5,339,170 A * | 8/1994 | Fan | .............................. | 358/3.08 |
| 5,343,309 A * | 8/1994 | Roetling | ....................... | 358/3.07 |
| 5,502,578 A * | 3/1996 | Smitt | ............................. | 358/474 |
| 6,016,370 A * | 1/2000 | Hatakeyama et al. | ......... | 382/299 |
| 6,101,285 A * | 8/2000 | Fan | .............................. | 382/260 |
| 6,970,194 B1 * | 11/2005 | Smith | ............................ | 348/247 |
| 7,203,371 B2 * | 4/2007 | Simard et al. | ................. | 382/239 |
| 7,423,769 B2 * | 9/2008 | Yu | ................................. | 358/1.1 |
| 7,738,132 B2 * | 6/2010 | Yu | ............................... | 358/1.15 |
| 7,746,519 B2 * | 6/2010 | Frei | .............................. | 358/474 |
| 7,783,121 B1 * | 8/2010 | Cox | .............................. | 382/254 |
| 7,801,385 B2 * | 9/2010 | Chiu | ............................. | 382/254 |
| 7,881,551 B2 * | 2/2011 | Paik et al. | .................... | 382/260 |
| 2007/0159495 A1 * | 7/2007 | Chang et al. | .................. | 345/617 |
| 2007/0237411 A1 * | 10/2007 | Mizuno | .......................... | 382/240 |
| 2009/0244602 A1 * | 10/2009 | Suse | ........................... | 358/1.15 |

FOREIGN PATENT DOCUMENTS

| | | |
|---|---|---|
| JP | 3679349 | 5/2005 |
| JP | 2006-185052 | 7/2006 |

\* cited by examiner

*Primary Examiner* — Negussie Worku
(74) *Attorney, Agent, or Firm* — Oblon, Spivak, McClelland, Maier & Neustadt, L.L.P.

(57) ABSTRACT

An image processing apparatus includes an input unit configured to obtain image data and to perform an input process on the image data to produce input image data, an input filter configured to control the input process performed by the input unit, an output unit configured to perform an output process on processed image data, an output filter configured to control the output process performed by the output unit, a process filter connecting between the input filter and the output filter to control processing of the input image data, and another output filter configured to control an output process for storing given image data and conditions concerning outputting of the given image data in a storage unit. The other output filter is coupled to one of the input filter and the process filter in response to receiving an instruction to store the given image data.

10 Claims, 24 Drawing Sheets

FIG.7

| SETTING UI |
|---|
| LOGIC UNIT |

FIG.10A

KEEPING TABLE 10

| ITEM NAME | | VALUE |
|---|---|---|
| BIBLIOGRAPHIC DATA | FILE NAME | sample.doc Mexican aster |
| OUTPUT CONDITIONS (1) | FILTER NAME FILTER ID | PROCESS FILTER 132A 65 |
| | FILTER NAME FILTER ID | PRINT FILTER 133a 52 |

FIG.10B

EDIT CONDITION TABLE 12

| ITEM NAME | VALUE |
|---|---|
| FILTER CONDITION | NUMBER OF AGGREGATION 2 |

FIG.10C

PRINT CONDITION TABLE 14

| ITEM NAME | VALUE |
|---|---|
| FILTER CONDITION | NUMBER OF PRINTS 2 |
| | OUTPUT SIZE A4 |
| | TRAY TRAY 3 |
| | PRINT SIDE BOTH SIDES |
| | COLOR MODE FULL COLOR |

FIG.11

| DATA SET ID | ITEM NAME | DATA TYPE | DATA VALUE |
|---|---|---|---|
| KEEPING TABLE 10 | DOCUMENT NAME<br>OWNER<br>DATA LINK: OUTPUT CONDITION | TEXT<br>TEXT<br>LINK | sample.doc<br>Mexican aster<br>(1) |

TABLE: OUTPUT CONDITIONS

| DATA SET ID | ITEM NAME | DATA TYPE | DATA VALUE |
|---|---|---|---|
| OUTPUT CONDITIONS (1) | DATA LINK: CONDITION<br>DATA LINK: CONDITION | LINK<br>LINK | 1<br>2 |

| DATA SET ID | ITEM NAME | DATA TYPE | DATA VALUE |
|---|---|---|---|
| 1<br>2 | FILTER NAME<br>FILTER ID<br>FILTER NAME<br>FILTER ID | TEXT<br>POSITIVE NUMBER<br>TEXT<br>POSITIVE NUMBER | EDIT FILTER<br>65<br>PRINT FILTER<br>52 |

| FILTER ID | ITEM NAME | DATA TYPE | DATA VALUE |
|---|---|---|---|
| 65 | NUMBER OF AGGREGATION | POSITIVE NUMBER | 2 |

| FILTER ID | ITEM NAME | DATA TYPE | DATA VALUE |
|---|---|---|---|
| 52 | NUMBER OF PRINTS<br>OUTPUT SIZE<br>TRAY<br>PRINT SIDE<br>COLOR MODE | POSITIVE NUMBER<br>ENUMERATION VALUE<br>ENUMERATION VALUE<br>ENUMERATION VALUE<br>ENUMERATION VALUE | 2<br>A4<br>TRAY 3<br>BOTH SIDES<br>FULL COLOR |

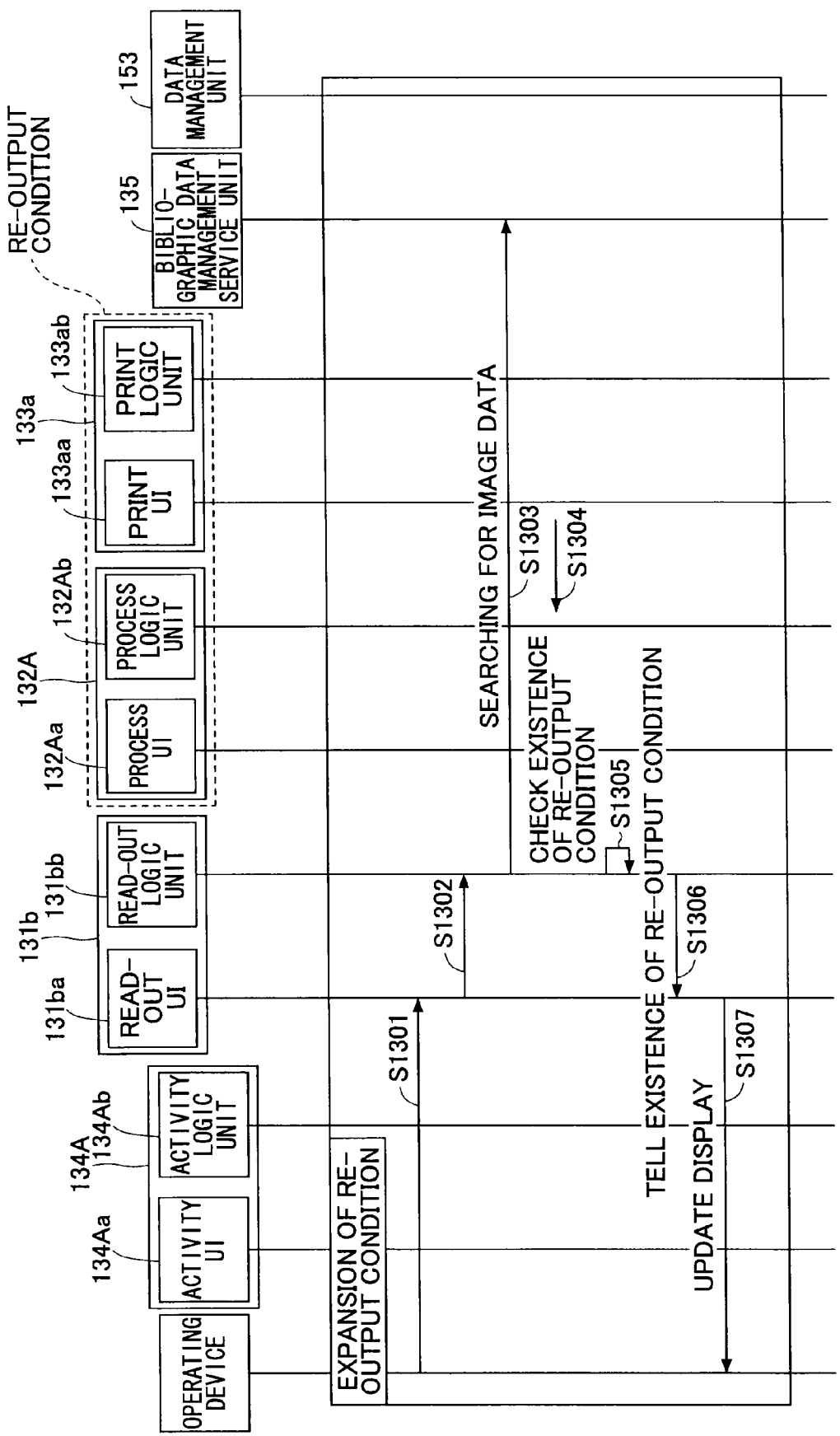

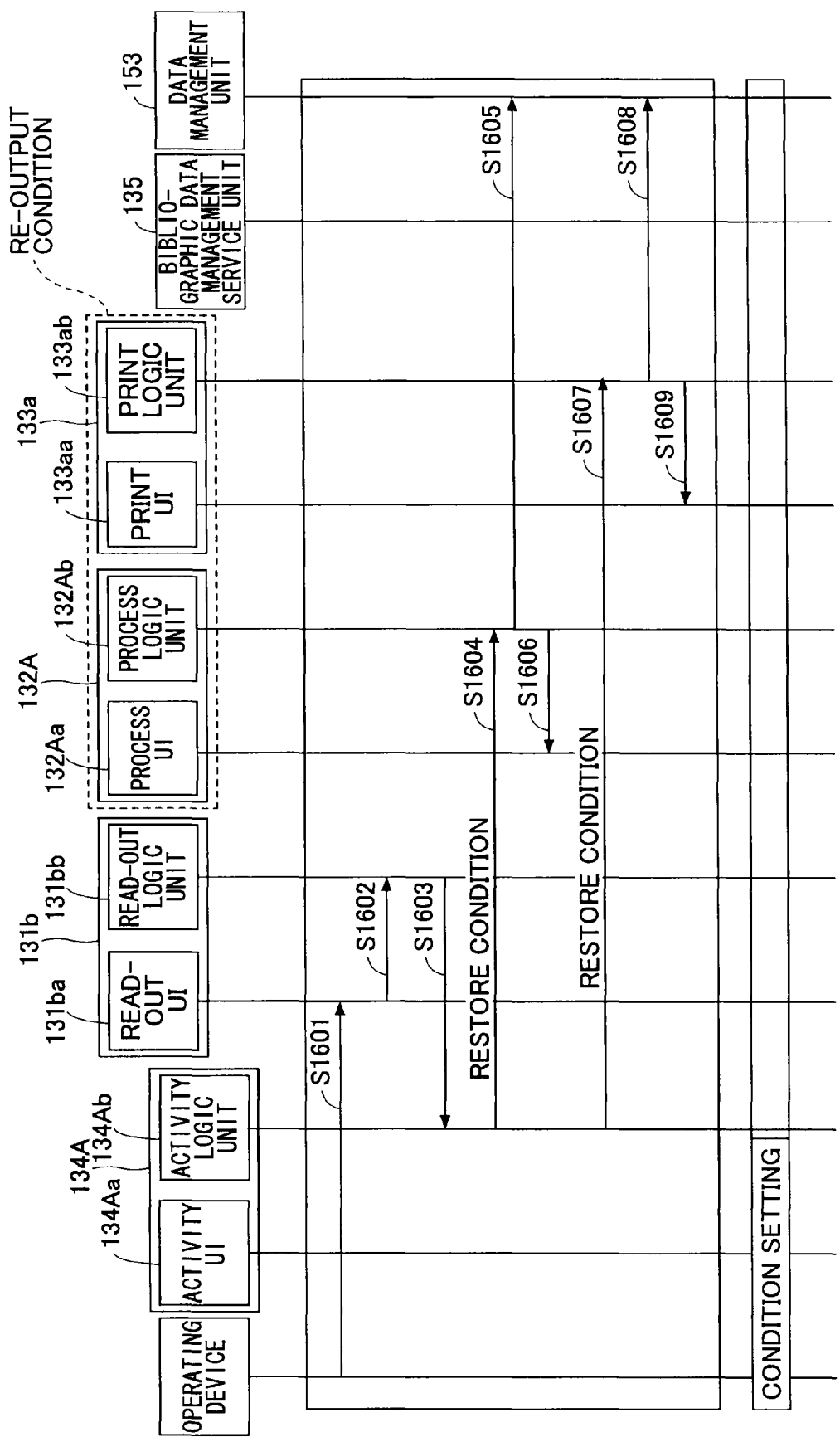

IMAGE PROCESSING APPARATUS

BACKGROUND OF THE INVENTION

1. Field of the Invention

The present invention relates to an image processing apparatus.

2. Description of the Related Art

In recent years, image processing apparatus such as multifunction devices that manage the functions of a printer, a copying machine, a scanner, and a fax machine in one housing generally incorporate a CPU similar to a computer and their functions are realized by controlling applications.

For example, an image forming device described in Japanese Patent No. 3679349 (Patent Document 1) includes functions used in common by applications as a platform. The applications can be implemented by using an API (Application Programming Interface) of this platform. According to this image forming device, with the commonly used functions provided as a platform, redundant implementation of functions in the applications can be avoided, which improves development efficiency of the applications as a whole.

With the related art structures, however, the development efficiency of the applications is sometimes not improved as much as expected if the granularity of the functions or the interface provided by this platform is not appropriately designed.

If this granularity is too high, the API is called too often even though the application provides merely a simple service. As a result, the source code becomes complicated.

If the granularity is too low, on the other hand, the platform is required to be modified internally when an application providing a partly modified service is required to be implemented, which leads to an increase of development steps. In particular, when modules in the platform depend largely on each other, not only is a new function required to be added to the platform but an existing part may also require modification. Thus, the development process becomes more complicated.

In the case of implementing an existing application with a partly modified service (for example, an input process of an image), it is impossible to call the unmodified part of the application for the unmodified function. Therefore, a new application is required to be implemented by writing new source code.

SUMMARY OF THE INVENTION

It is an object of at least one embodiment of the invention to provide an image processing apparatus which can simplify customization, extension, and the like of the functions.

According to one aspect of the invention, an image processing apparatus includes an input unit configured to obtain image data and to perform an input process on the image data to produce input image data, an input filter configured to control the input process performed by the input unit, an output unit configured to perform an output process on processed image data, an output filter configured to control the output process performed by the output unit, a process filter connecting between the input filter and the output filter to control processing of the input image data, and another output filter configured to control an output process for storing given image data and conditions concerning outputting of the given image data in a storage unit. The other output filter is coupled to one of the input filter and the process filter in response to receiving an instruction to store the given image data.

According to another aspect of the invention, an image processing apparatus includes an input unit configured to obtain image data and to perform an input process on the image data to produce an input image data, an input filter configured to control the input process performed by the input unit, an output unit configured to perform an output process on processed image data to produce output image data, an output filter configured to control the output process performed by the output unit, a process filter connecting between the input filter and the output filter to control processing of the input image data to produce the processed image data, and another input filter configured to control an input process for reading out image data stored in a storage unit storing the image data and conditions concerning outputting of the image data. The other input filter is coupled to one of the process filter and the output filter in response to receiving an instruction to read the image data stored in the storage unit.

According to another aspect of the invention, an image processing apparatus includes an input unit configured to obtain image data and to perform an input process on the image data to produce an input image data, an input filter configured to control the input process performed by the input unit, an output unit configured to perform an output process on processed image data to produce output image data, an output filter configured to control the output process performed by the output unit, a process filter connecting between the input filter and the output filter to control processing of the input image data to produce the processed image data, another output filter configured to control an output process for storing given image data and conditions concerning outputting of the given image data in a storage unit, and another input filter configured to control an input process for reading out the image data stored in the storage unit. The other output filter is coupled to one of the input filter and the process filter in response to receiving an instruction to store the given image data. The other input filter is coupled to one of the process filter and the output filter in response to receiving an instruction to read the image data stored in the storage unit.

According to at least one embodiment of the invention, customization and enhancement of the functions can be simplified and stored image data can be easily re-outputted.

BRIEF DESCRIPTION OF THE DRAWINGS

FIG. 7 is a diagram showing a configuration of each filter;

FIGS. 10A through 10C are diagrams showing settings of the output conditions;

FIG. 11 is a diagram showing an example of the output conditions;

FIG. 13 is a sequence diagram showing a selecting process of image data to be re-outputted in the image processing apparatus of the second embodiment;

FIG. 16 is a sequence diagram showing a selecting process of image data to be re-outputted in the image processing apparatus of the second embodiment;

DETAILED DESCRIPTION OF THE PREFERRED EMBODIMENTS

The invention employs a software architecture based on an idea called pipes & filters in the image processing apparatus, thereby the customization, enhancement, and the like of the functions are simplified. Moreover, the invention easily realizes a re-output of stored image data.

Figure 1:
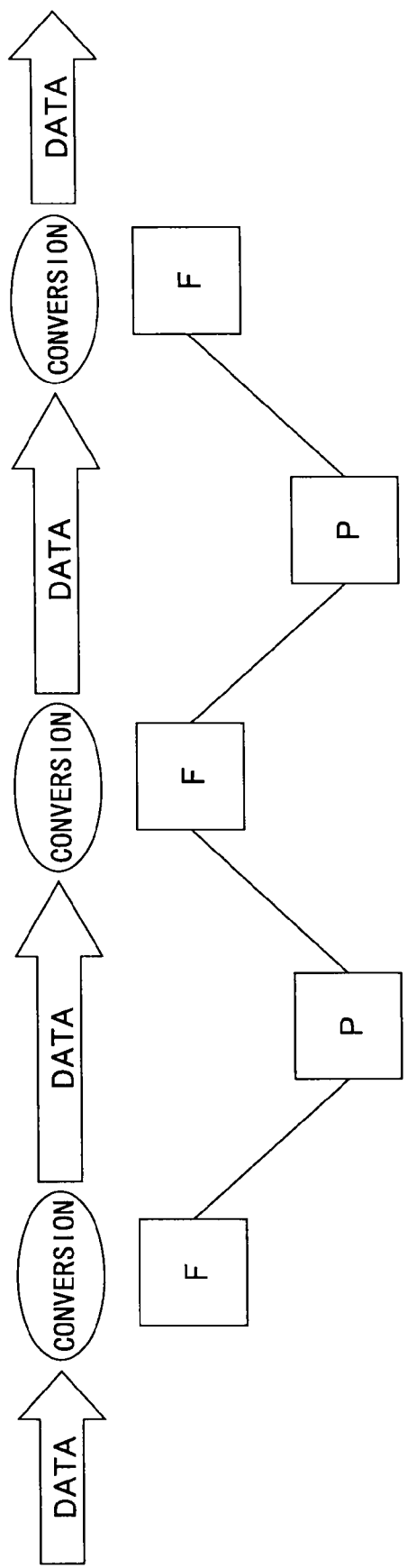
FIG. 1 is a diagram showing the idea of pipes & filters.

Hereinafter, the idea of pipes & filters employed in the image processing apparatus of the invention is described, prior to describing the embodiments of the invention. FIG. 1 is a diagram showing the idea of pipes & filters. "P" shown in FIG. 1 denotes a pipe and "F" denotes a filter.

The filter is a program which applies a predetermined process to inputted data and outputs a process result. The pipe is a unit which connects the filters. The pipe temporarily holds the process result outputted from the filter connected on an input side of the pipe and then transfers the data to the filter connected on an output side of the pipe. In this manner, according to the idea of pipes & filters, the processes of the filters can be continuous through the pipes.

In the invention, the predetermined processes performed by the filters are considered to apply a predetermined conversion to the inputted data. That is, each function realized by the image processing apparatus is considered to be continuous "conversion processes" applied to a document (input data) in the image processing apparatus of this embodiment. Each function of the image processing apparatus is thought to include input, processing, and output of the document, which is data. In this embodiment, each of the "input process", "processing" and "output process" is considered to be a "conversion process" and a software component which realizes one conversion process is a filter.

In the invention, a filter which controls a data input process is called an input filter, a filter which controls data processing is called a processing filter, and a filter which controls a data output process is called an output filter. Each of these filters is an independent program without dependence among them. Therefore, each filter can be independently added (installed) or deleted (uninstalled) as a filter unit in the image processing apparatus.

Embodiment 1

Hereinafter, an image processing apparatus 100 of Embodiment 1 of the invention is described with reference to the drawings.

Figure 2:
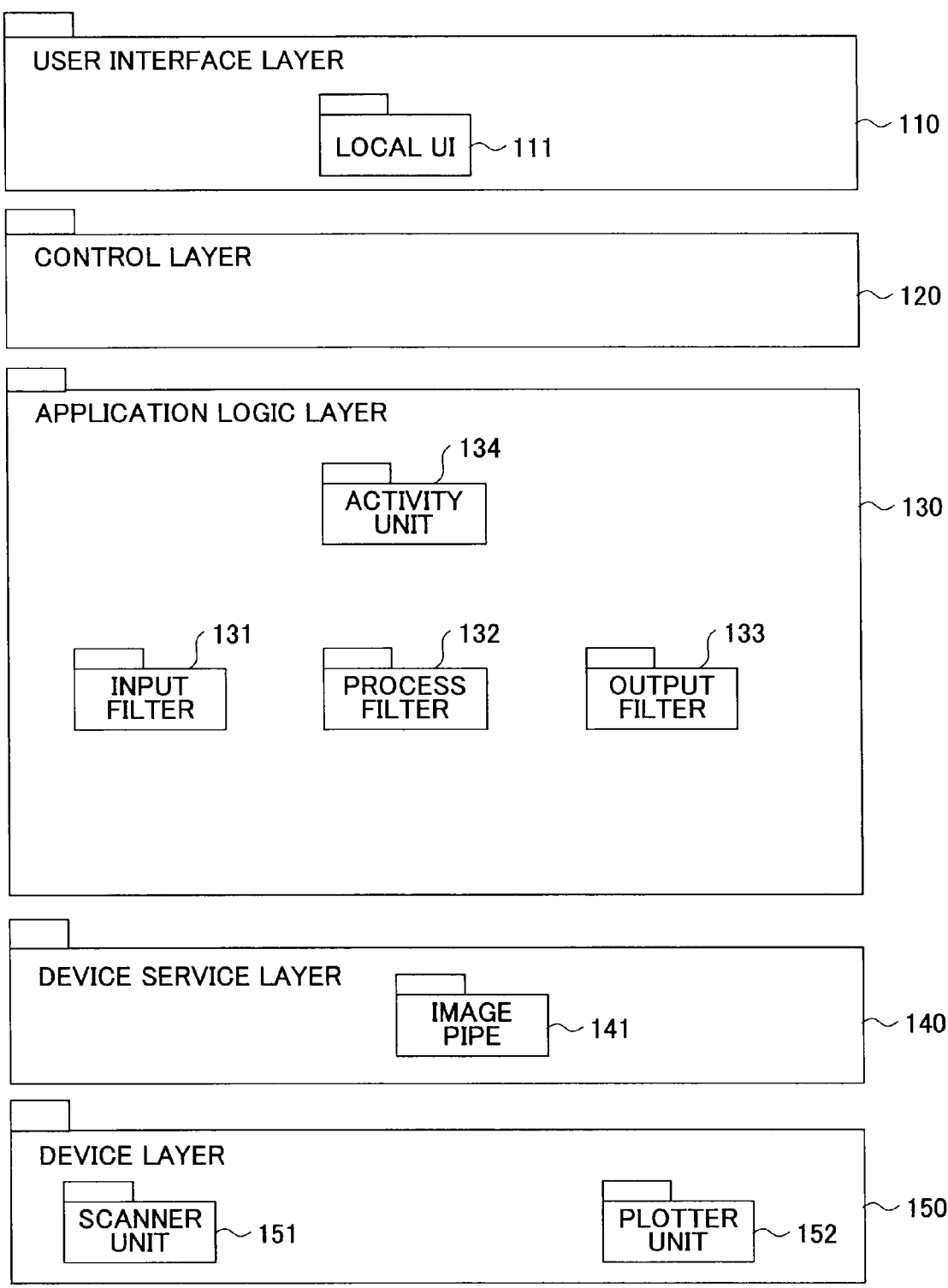
FIG. 2 is a configuration diagram showing a software configuration of an image processing apparatus of a first embodiment.

FIG. 2 is a configuration diagram showing a software configuration of the image processing apparatus 100 of Embodiment 1 of the invention. The image processing apparatus 100 is a complex machine which manages plural functions of a printer, a copying machine, a scanner, a facsimile machine, or the like in one housing.

Software realizing the functions of the image processing apparatus 100 has a hierarchical structure including a user interface layer 110, a control layer 120, an application logic layer 130, a device service layer 140, and a device layer 150. The hierarchical relationship of these layers is based on the relationship of calling between the layers. That is, an upper layer calls a lower layer in the drawing.

When a user sends an instruction for the execution of various functions by the user interface layer 100 in the image processing apparatus 110, the user interface layer 110 calls the control layer 120 and controls the application logic layer 130 based on this execution instruction. The application logic layer 130 executes an application which realizes the requested function based on the instruction from the control layer 120. Based on this execution result, the device service layer 140 and the device layer 150 control a hardware resource of the image processing apparatus 100. In this manner, the image processing apparatus 100 obtains an output result corresponding to the function that the user interface layer 110 has received.

Each layer is described below.

The user interface layer 110 incorporates, for example, a local UI (user interface) unit 111 to receive an execution instruction to realize various functions of the image processing apparatus 100. The various functions here are a copying function, a printing function, a scanning function, a facsimile function, and the like. The local UI unit 111 may be provided, for example, in an operating unit (not shown) where processes executed in the image processing apparatus 100 are operated. This operating unit may be realized by an operations panel or the like having a display area. In the user interface layer 110, the execution instruction received in the local UI unit 111 is transferred to the control layer 120.

The control layer 120 incorporates functions for controlling the processes to realize each function of the image processing apparatus 100. In specific terms, execution of each filter in the application logic layer 130 is controlled in accordance with the requested function. It is to be noted that a function of the image processing apparatus 100 described in the following embodiments is one service unit (from a request input to a final output) that the image processing apparatus 100 provides to the user and software-wise is the same as an application which provides one service unit.

The application logic layer 130 incorporates various filters as a component group which realizes a part of the functions provided in the image processing apparatus 100. In the application logic layer 130, one function is realized by using plural filters in combination with control of the control layer 120. The application logic layer 130 in this embodiment incorporates an input filter 131, a process filter 132, an output filter 133, and an activity unit 134. Each filter incorporated in the application logic layer 130 is operated and controlled based on the definition of that filter itself. The activity unit 134 is a component which connects each filter in accordance with the function requested in the user interface layer 110 and controls the execution of each filter.

The device service layer 140 incorporates a lower function used in common by each filter incorporated in the application logic layer 130. The device service layer 140 of this embodiment incorporates an image pipe 141. The image pipe 141 which realizes the pipe function transfers an output result of one filter to another filter among the filters incorporated in the application logic layer 130. Here, the image pipe 141 may connect, for example, the input filter 131 with the process filter 132, or the process filter 132 with the output filter 133.

The device layer 150 incorporates a driver as a program which controls hardware. The device layer 150 of this embodiment incorporates a scanner unit 151, a plotter unit 152, and the like. Each of these control units controls a device of its name.

Hereinafter, each filter incorporated in the application logic layer 130 is further described.

The input filter 131 of this embodiment controls an input process of data inputted externally to the image processing apparatus 100. The input filter 131 includes a read filter, an email receive filter, a facsimile receive filter, a PC document receive filter, and the like (not shown). The read filter, for example, controls reading of image data by a scanner and outputs the read image data. The email receive filter receives an email in the image processing apparatus 100 and outputs data included in the received email. The facsimile receive filter controls receiving of facsimiles and outputs the received data. The PC document receive filter receives print data from a client PC or the like that is not shown and outputs the print data. A report filter (not shown) organizes setting data, history data, or the like of the image processing apparatus 100 into, for example, a table format and outputs the organized data.

The process filter 132 of this embodiment applies a predetermined process to the image data inputted from the filter on the input side of the process filter 132 and outputs the process result to the filter on the output side of the process filter 132. The process here is aggregation, expansion, shrinking, rotation, or the like of the inputted data.

The output filter 133 controls an output process of the inputted data and outputs the data outside the image processing apparatus 100. The output filter 133 includes a print filter, a preview filter, and the like. The output filter 133 shown in FIG. 2 includesan email send filter, a facsimile send filter, a PC document send filter, and the like.

The print filter outputs (prints) the inputted data to the plotter unit 152. The preview filter causes an operating unit or the like which is not shown included in the image processing apparatus 100 to preview the inputted data. Further, the email send filter attaches the data to an email and sends it. The facsimile send filter sends the inputted data by facsimile. The PC document send filter sends the inputted data to a client PC or the like which is not shown.

An instruction inputted from the local UI unit 111 in the user interface layer 110 is transferred through the control layer 120 to the activity unit 134. The activity unit 134 controls execution of jobs in the input filter 131, the process filter 132, and the output filter 133.

In the application logic layer 130, each function of the image processing apparatus 100 is realized by using the filters 131 to 134 in combination. According to this configuration, various functions can be realized by using the filters and pipes in combination in the image processing apparatus 100. In specifics, the read filter included in the input filter 131, the process filter 132, and the print filter included in the output filter 133 are to be used in combination to realize a copying function, for example.

Figure 3:
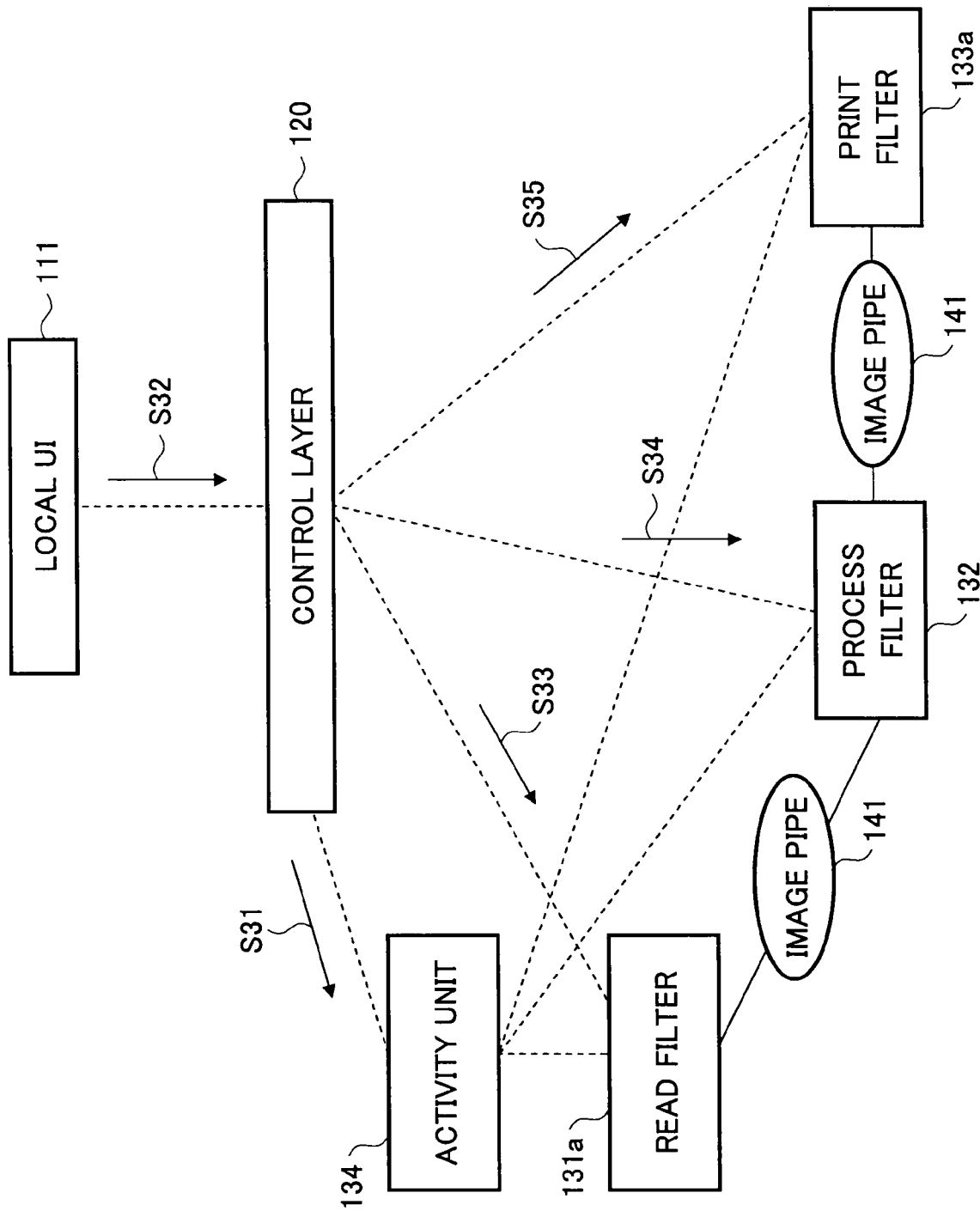
FIG. 3 is a diagram showing a printing process of the image processing apparatus of the first embodiment.

Hereinafter described is a printing process in the image processing apparatus 100 of this embodiment. FIG. 3 is a diagram showing a printing process in the image processing apparatus of Embodiment 1.

The control layer 120 in the image processing apparatus 100 in this embodiment sends a job to the activity unit 134 to control execution of a process of each filter (S31). The image processing apparatus 100 of this embodiment may generate and send a job to this activity unit 134 when, for example, power of the image processing apparatus 100 is turned on.

Here, when an execution request of a printing process is made in the local UI unit 111, the local UI unit 111 transfers this request to the control layer 120 (S32). Note that the description in this embodiment is made based on the premise that a copying process as one of the printing processes is selected. In this case, an operation to select reading and printing of a paper document is performed in the local UI unit 111.

The activity unit 134 connects a read filter 131a, the process filter 132, and a print filter 133a through the image pipes 141. Note that a read filter included in the read filter 131a is connected to the process filter 132 in actuality. Subsequently, the control layer 120 generates a job (S33) to be executed by the read filter 131a, a job (S34) to be executed by the process filter 132, and a job (S35) to be executed by the print filter 133a.

When the jobs to be executed by filters 131a, 132, and 133a are sent from the control layer 120, the activity unit 134 sends an instruction to each filter to execute the corresponding job. Then, the read filter 131a reads the paper document from the scanner unit 151 as an input unit and thus the paper document is read in as image data. These image data are outputted from the read filter 131a and transferred to the process filter 132 through the image pipe 141.

In the process filter 132, a predetermined process set in advance is applied to these image data and the data are outputted as the processed image data. The processed image data are then transferred to the print filter 133a as one of the output filters 133. In the print filter 133a, the processed image data are outputted from the plotter unit 152 as an output unit to realize a copying process.

In this manner, the input filter 131, the process filter 132, and the output filter 133 are each independently controlled and no dependence exists among the filters in this embodiment. Therefore, when the functions are customized, expanded, or the like, the appropriate filter is to be customized or the like in this embodiment. According to this embodiment, customization, expansion, or the like of the functions can be simplified.

Embodiment 2

Embodiment 2 of the invention is hereinafter described. Embodiment 2 of the invention is the same as Embodiment 1 with improvement. Thus, components with similar functional structures to those in Embodiment 1 are denoted by the same or similar reference numerals, and their descriptions are not repeated.

Prior to describing this embodiment, problems to be solved in this embodiment are described.

Figure 4:
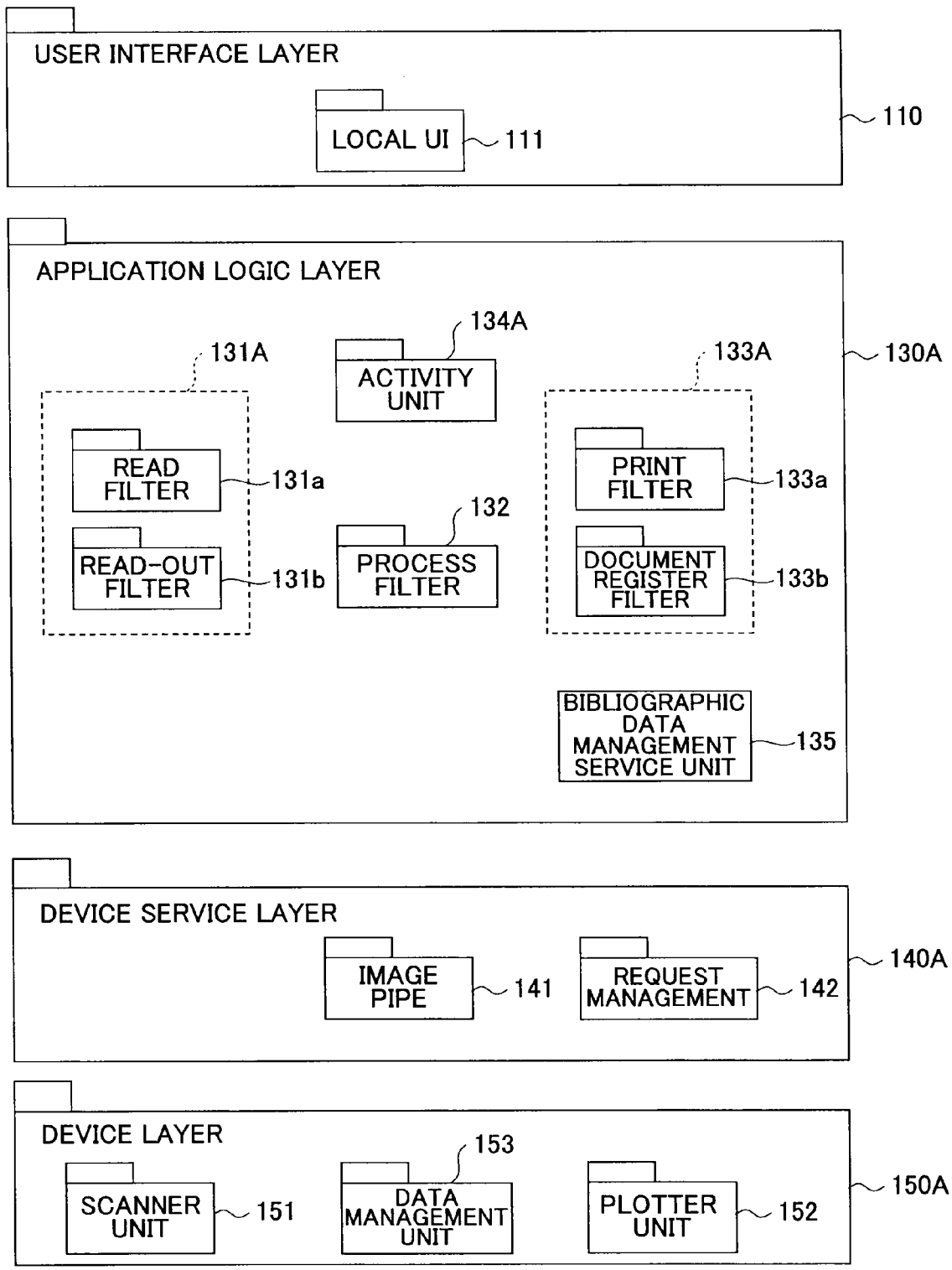
FIG. 4 is a configuration diagram showing a software configuration of an image processing apparatus of a second embodiment.

In Embodiment 2, the case of re-outputting image data stored in a hard disk or the like in the image processing apparatus 100 is considered (see FIG. 4). Note that re-outputting in this embodiment means, for example, when the image data outputted by the print filter 133a are to be re-outputted, to read out and re-print the image data. When the image data outputted by an email send filter are to be re-outputted, re-outputting means to read out and re-send these image data by an email.

Assuming that the image data are to be re-outputted, the image processing apparatus 100A is required to retain the image data at the same time as outputting the image data so that they can be re-outputted anytime. To be specific, the image processing apparatus 100A is required to retain output conditions such as setting conditions or the like with the image data when the image data are outputted. With the output conditions of the image data being retained, the image data can be restored to be re-outputted based on the output conditions.

A feature of pipes & filters is that various functions can be freely realized by using the filters in combination. In this embodiment, an image processing apparatus is provided which can retain image data capable of being re-outputted without spoiling the freedom of filter combinations, and easily re-output the retained image data.

The image processing apparatus 100A of this embodiment includes a document register filter 133b which relates the image data outputted from the output filter 133 with the output conditions of the image data and stores them and a read-out filter 131b which reads out the stored image data together with the output conditions of the image data; thereby the stored image data can be easily re-outputted.

FIG. 4 is a configuration diagram showing a software configuration of the image processing apparatus 100A of Embodiment 2 of the invention.

The image processing apparatus 100A of this embodiment includes an input filter 131A, a process filter 132, an output filter 133A, and a bibliographic data management service unit 135 in an application logic layer 130A. Moreover, the image processing apparatus 100A of this embodiment includes a request management unit 142 in a device service layer 140A and a data management unit 153 in a device layer 150A.

The image processing apparatus 100A of this embodiment does not include the control layer 120 included in the image processing apparatus 100 of Embodiment 1. In the image processing apparatus 100A of this embodiment, the role of the control layer 120 included in the image processing apparatus 100 of Embodiment 1 is shared by an activity unit 134A of the application logic layer 130A and the request management unit 142 of the device service layer 140A. That is to say, the activity unit 134A of this embodiment originates instructions for connection between the filters and execution of jobs of the filters while the request management unit 142 generates jobs to be executed by the filters and connects between the filters as instructed by the activity unit 134A.

The input filter 131A includes the read-out filter 131b in addition to the read filter 131a. The read-out filter 131b reads out and outputs image data and output conditions of the image data from a storage device such as a hard disk which is described below. The read-out filter 131b is described in detail below.

The output filter 133A includes the document register filter 133b in addition to the print filter 133a. The document register filter 133b outputs the image data and the output conditions of the image data to a storage device and stores the image data and the output conditions of the image data. The document register filter 133b is described in detail below.

The bibliographic data management service unit 135 controls a data management memory or the like which temporarily holds image data and output conditions when the document register filter 133b stores the image data and the output conditions.

The data management unit 153 in the device layer 150 controls the retaining of data in a storage device such as a hard disk included in the image processing apparatus 100A.

Figure 5:
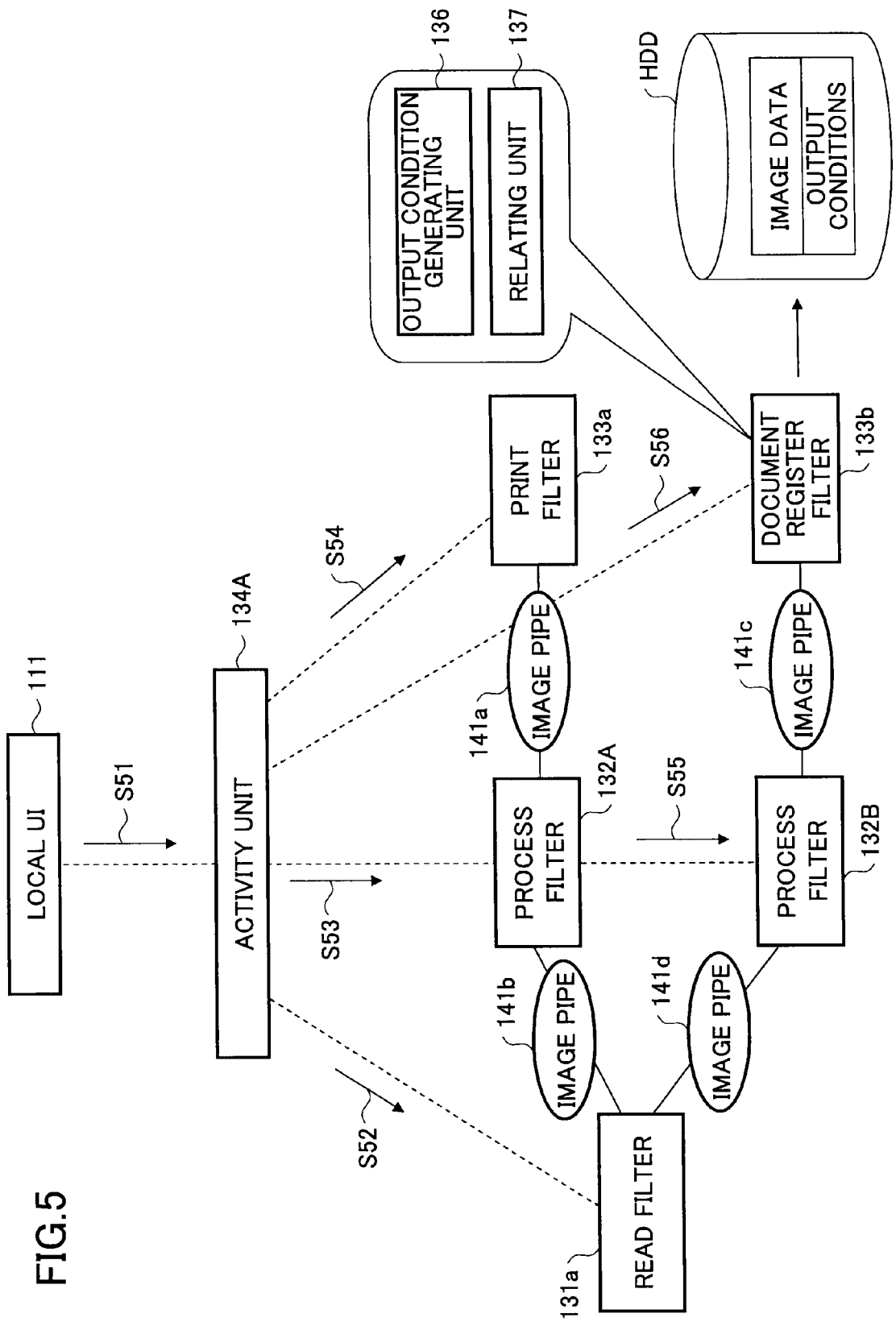
FIG. 5 is a diagram showing a storing process of image data in the image processing apparatus of the second embodiment.

Hereinafter described is an outline of the image data keeping process and the re-output process of the image data in the image processing apparatus 100A of this embodiment. First, the image data keeping process in the image processing apparatus 100A is described. FIG. 5 shows the image data keeping process in the image processing apparatus 100A of Embodiment 2.

In the image processing apparatus 100A of this embodiment, output conditions of image data are retained with the image data when retaining the image data. As a result, the image data reflecting the same conditions as set when outputting the image data can be outputted based on the output conditions when re-outputting the image data.

Here, the document register filter 133b in the image processing apparatus 100A of this embodiment is further described.

The document register filter 133b of this embodiment includes an output condition generating unit 136 and a relating unit 137. The output condition generating unit 136 generates output conditions of the image data to be retained. Generation of the output conditions is described in detail below. The relating unit 137 relates the image data to be stored with the output conditions generated by the output condition generating unit 136. The relating process is described in detail below.

FIG. 5 shows the case of retaining the image data to be printed. When the local UI unit 111 makes an instruction to print and keep the image data in the image processing apparatus 100A, the local UI unit 111 transfers this instruction to the activity unit 134 (S51).

Receiving this instruction, the activity unit 134A selects a filter to generate a job and connects the filters in accordance with the user's settings to realize the requested function. The activity unit 134A then transfers this setting information to the request management unit 142 for job generation.

The request management unit 142 generates a job to be executed in each filter based on filter connection settings received from the activity unit 134A and connects the filters. In the read filter 131a, a job to read the image data is generated. In process filters 132A and 132B, jobs to perform a process required to print the image data are generated. In the print filter 133a, a job to print the image data is generated. In the document register filter 133b, a job to keep the image data in a storage device HDD which is described below is generated.

In the example shown in FIG. 5, the activity unit 134A sends instructions to connect the print filter 133a to the process filter 132A through the image pipe 141a and to connect the process filter 132A to the read filter 131a through the image pipe 141b. The request management unit 142 connects the filters based on these connection instructions.

The activity unit 134A sends instructions to connect the document register filter 133b to the process filter 132B through the image pipe 141*c* and to connect the process filter 132B to the read filter 131*a* through the image pipe 141*d*. The request management unit 142 connects the filters based on these connection instructions.

When the filters are connected by the request management unit 142, the activity unit 134A then instructs the filters 131*a*, 132A, 133*a*, 132B, and 133*b* to execute the jobs S52, S53, S54, S55, and S56, respectively. At this time, the output condition generating unit 136 of the document register filter 133*b* generates output conditions based on the connecting relationships between the filters and the setting conditions of the filters, which are described below.

When the jobs are executed, the read filter 131*a* writes out the read image data to the image pipes 141*b* and 141*d*. The process filter 132A reads out the image data written out to the image pipe 141*b*, applies a predetermined process, and writes out the image data to the image pipe 141*a*. The print filter 133*a* reads out and prints the processed image data written out to the image pipe 141*c*.

The process filter 132B reads out the image data from the image pipe 141*d*, processes the image data, and writes the processed image data out to the image pipe 141*c*. When the document register filter 133*b* reads out the processed image data from the image pipe 141*c*, the image data are read out and related with the output conditions by the relating unit 137 and stored in the storage device HDD.

Note that the process filters 132A and 132B apply similar processes to the image data written out from the image pipe 141*b* and the image data written out from the image pipe 141*d*, respectively. Therefore, the image data written out from the image pipe 141*a* by the print filter 133*a* and the image data written out from the image pipe 141*c* by the document register filter 133*b* are similar. As a result, the document register filter 133*b* can retain the image data to be printed.

Figure 6:
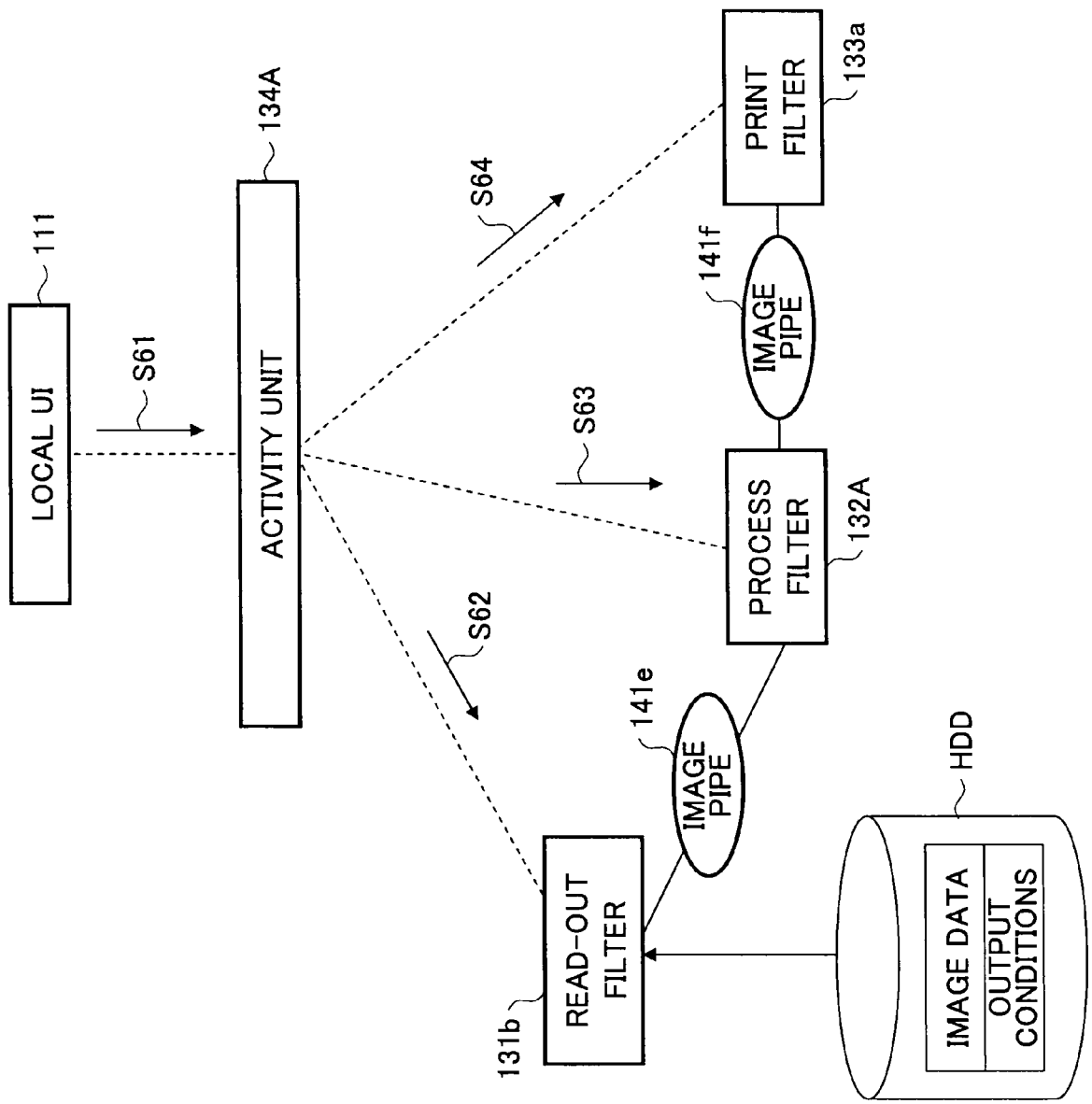
FIG. 6 is a diagram showing a re-output of the image data in the image processing apparatus of the second embodiment.

With reference to FIG. 6, the re-output of image data by the image processing apparatus 100A of this embodiment is described. FIG. 6 shows the re-output of image data by the image processing apparatus 100A of Embodiment 2.

FIG. 6 shows the case of re-reading and printing the image data printed by the print filter 133*a*. The read-out filter 131*b* of this embodiment restores the output conditions related to the image data to be re-outputted. The restoring of the output conditions are described in detail below.

In the image processing apparatus 100A, when the local UI unit 111 receives an instruction to re-output the image data, this instruction is transferred to the activity unit 134 (S61).

Here, the re-output instruction transferred to the activity unit 134A is a re-output instruction of the printed image data.

When the output conditions are restored by the read-out filter 131*b* in the image processing apparatus 100A, the activity unit 134A generates jobs to be executed in the read-out filter 131*b*, the process filter 132A, and the print filter 133*a* in order to execute the process to re-print the image data. When the jobs are generated, the activity unit 134A connects the filters based on the relationships between the jobs. Here, the read-out filter 131*b* and the process filter 132A are connected while the process filter 132A and the print filter 133*a* are connected.

When the filters 131*b*, 132A, and 133*a* are connected, the activity unit 134A instructs the filters to execute the jobs S62, S63, and S64, respectively. When the jobs are executed in the filters, the read-out filter 131*b* writes the image data out from the storage device HDD to the image pipe 141*e*. The process filter 132A reads out the image data from the image pipe 141*e*, applies a process to print the image data, and writes the processed image data out to the image pipe 141*f*. The print filter 133*a* writes out the image data from the image pipe 141*f* and prints it.

In this manner, the image data stored in the storage device HDD can be re-outputted by receiving a re-output instruction for the image data.

Here, a keeping process of the image data and the output conditions are described more specifically.

Figure 7:
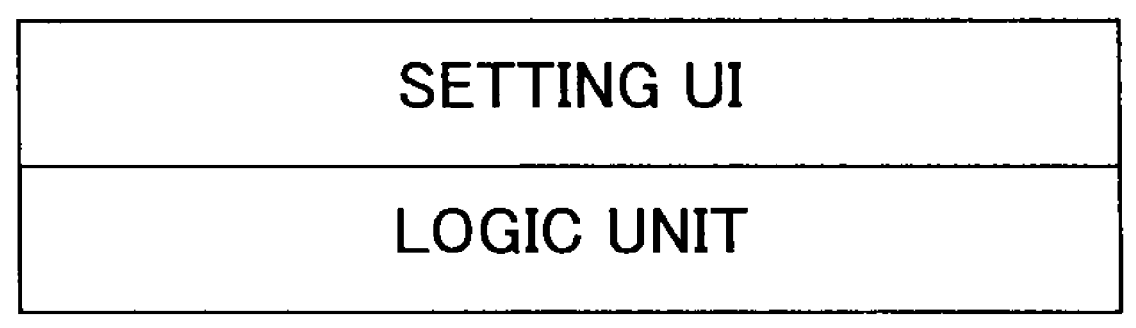

Each of the filters included in the application logic layer 130A of this embodiment has a configuration shown in FIG. 7. That is, each filter included in the application logic layer 130A of this embodiment is formed of a setting UI where settings of the filter are performed and a logic unit to control job execution.

Figure 8:
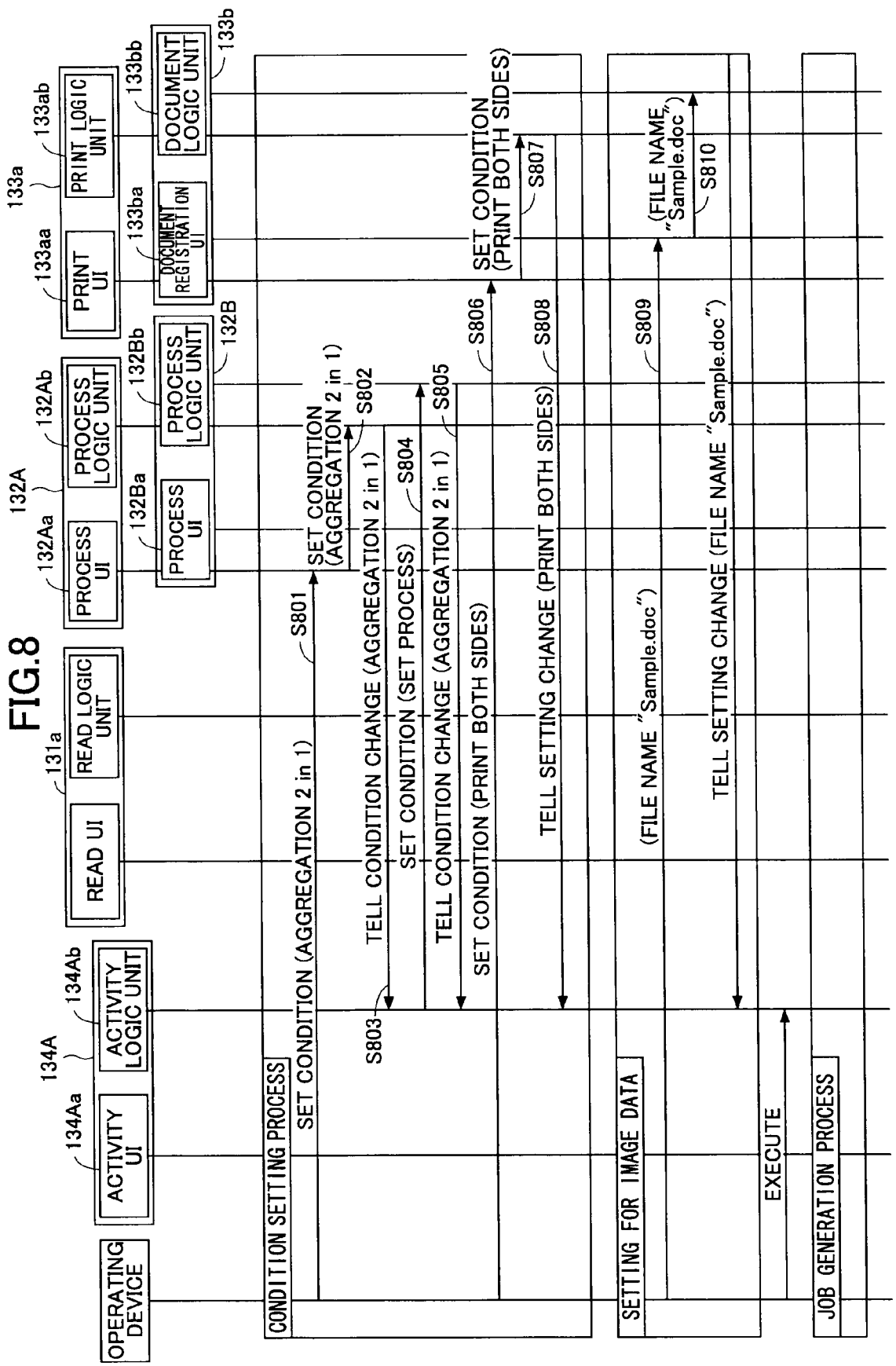
FIG. 8 is a sequence diagram showing a setting of document registration in the image processing apparatus of the second embodiment.

FIG. 8 is a sequence diagram showing settings of document registration in the image processing apparatus 100A of Embodiment 2.

In the image processing apparatus 100A of this embodiment, the image data and the output conditions are retained after the settings of document registration are made in the document registration filter 133*b*. Note that the settings of document registration here mean settings of the output conditions and bibliographic data of the image data.

First, a setting process of the output conditions in the image processing apparatus 100A is described. In the example of FIG. 8, the output conditions are to aggregate a document of two pages into one page and print both sides.

In the image processing apparatus 100A, an edit setting of the image data is performed in the process UI 132A*a* as a setting UI of the process filter 132A by an operating device which is described below (S801). Note that the process filter 132A is connected between the read filter 131*a* and the print filter 133*a*. In step S801, the edit condition of "2 in 1" (two pages are aggregated into one page) is set.

When the edit condition is set in the process UI 132A*a*, this edit condition is set in the process logic unit 132A*b* as well (S802). Then, the process logic unit 132A*b* advises the activity logic unit 134A*b* that the edit condition is changed into "2 in 1" (S803).

The activity logic unit 134A*b* also causes the process filter 132B to set a similar edit condition based on the edit condition set in the process UI 132A*a* (S804). Note that the process filter 132B is connected between the read filter 131*a* and the document register filter 133*b*. The process logic unit 132B*b* of the process filter 132B advises the activity logic unit 134A*b* that the edit condition is changed into "2 in 1" (S805).

Subsequently, a print condition is set in a print UI 133*aa* as a setting UI of the print filter 133*a* by the operating device (S806). The print condition set here is to print both sides. When the print condition is set, the print UI 133*aa* sets this print condition in a print logic unit 133*ab* as well (S807). The print logic unit 133*ab* tells the activity logic unit 134A*b* that the print condition is changed into "print both sides" (S808).

Here, the edit condition and the print condition of the image data, that is the output conditions of the image data are set in the image processing apparatus 100A.

Next, setting the bibliographic data of the image data by the document register filter 133*b* is described. After the output conditions are set, the bibliographic data of the image data to be retained with the output conditions can be set in the image processing apparatus 100A of this embodiment.

When an instruction to set the bibliographic data in a document register UI 133*ba* of the document register filter 133*b* (S809) is made by the operating device, the document register UI 133*ba* sends an instruction to set the bibliographic data to a document register logic unit 133*bb* (S810). Note that in this embodiment the bibliographic data are set when a file name of the image data is set as the bibliographic data of the image data.

In this manner, the bibliographic registration is set in the image processing apparatus 100A of this embodiment.

When the output conditions and the document registration are set in the image processing apparatus 100A, the activity unit 134A generates a job to be executed in each filter. The process as shown in FIG. 5 is performed after the jobs to be executed in the filters are generated by the activity unit 134A.

Next, keeping of the output conditions in this embodiment is described.

Figure 9:
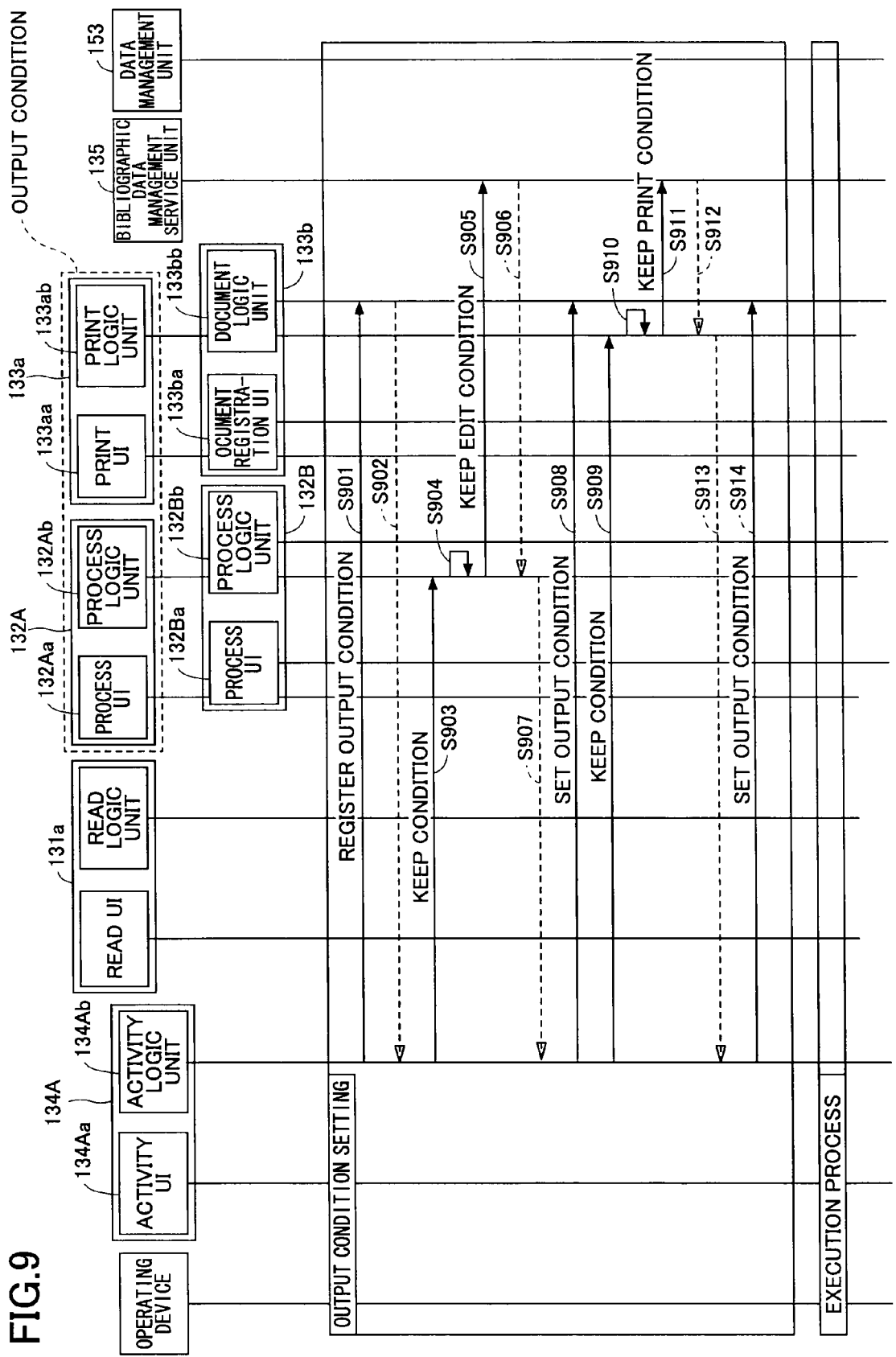
FIG. 9 is a sequence diagram showing a storing process of output conditions in the image processing apparatus of the second embodiment.

The document register filter 133b of this embodiment performs a process to relate the image data with the output conditions and store them in the storage device HDD through the bibliographic data management service unit 135. Hereinafter, the keeping process of the output conditions is described with reference to FIGS. 9 and 10. FIG. 9 is a sequence diagram showing the keeping process of the output conditions in the image processing apparatus 100A of Embodiment 2. FIG. 10 is a diagram showing settings of the output conditions.

When the document registration is set in the image processing apparatus 100A, the activity logic unit 134Ab transfers an instruction to keep the output conditions to the document registration logic unit 133bb (S901). Receiving this keeping instruction, the output condition generating unit 136 generates a keeping table 10 which is described below and tells the activity logic unit 134Ab about the table generation (S902).

Here, the keeping table 10 is described with reference to FIG. 10.

The keeping table 10 shown in FIG. 10A is generated and stored on a storage device included in the image processing apparatus 100A. The keeping table 10 contains a file name of the image data, which is set in the document register UI 133ba, a filter name through which filter the image data pass during the interval from input to output in the image processing apparatus 100A and a filter ID. Note that in FIG. 10A the process filter 132A, the print filter 133a, and the filter ID are stored, however, only the process filter 132A is retained in the keeping table 10 at the point of S901 in FIG. 9. Moreover, the filter name and ID of each filter may be set in advance in the image processing apparatus 100A. In this embodiment, the process filter 132A has a filter ID of 65 and the print filter 133a has a filter ID of 52.

In FIG. 9, the activity logic unit 134Ab instructs the process logic unit 132Bb to keep the edit condition set in the process UI 132Aa (S903). Receiving this instruction, the process logic unit 132Ba generates an edit condition table 12 which is described below (S904) and stores the edit condition set in the process UI 132Aa in the bibliographic data management service unit 135 (S905).

FIG. 10B shows the edit condition table 12. The edit condition table 12 stores the edit condition set in the process filter 132A. In the example of FIG. 10B, the edit condition of "2 in 1" is stored.

In FIG. 9, when the process logic unit 132Bb is instructed to retain the edit condition (S906), the process logic unit 132Bb reports to the activity logic unit 134Ab that the edit condition is retained (S907).

The activity logic unit 134Ab sends a registration instruction to the document register logic unit 133bb to relate the ID of the process filter 132A stored in the keeping table 10 and the edit condition stored in the edit condition table 12 (S908).

Here, the relating unit 137 of the document register filter 133b relates the process filter 132A and the edit condition set in the process filter 132A.

The activity logic unit 134Ab sends an instruction to the print logic unit 133ab to retain the print condition set in the print UI 133aa (S909). Receiving this instruction, the print logic unit 133ab generates a print condition table which is described below (S910) and retains the print condition set in the print UI 133aa in the bibliographic data management service unit 135 (S911). Note that the filter name and the filter ID of the print filter 133a may be stored in the keeping table 10.

FIG. 10C shows a print condition table 14. The print condition table 14 stores the print condition set in the print filter 133a. In the example of FIG. 10C, the print condition of "print both sides" is stored. The print condition table 14 may store, for example, the number of prints, a paper size, a color mode, and the like as shown in FIG. 10C.

In FIG. 9, when the print logic unit 133ab is instructed to retain the print condition (S912), the print logic unit 133ab advises the activity logic unit 134Ab that the print condition is retained (S913).

The activity logic unit 134Ab sends a keeping instruction to the document register logic unit 133bb to relate the ID of the print filter 133a stored in the keeping table 10 with the print condition stored in the print condition table 14 (S914) and retain them. Here, the print filter 133a and the print condition set in the print filter 133a are related.

As described above, the edit condition related to the process filter 132A and the print condition related to the print filter 133a are used as output conditions in this embodiment. Here, the document register filter 133b relates the keeping table 10, the edit condition table 12, and the print condition table 14 by using the relating unit 137.

FIG. 11 shows an example of output conditions. In the output conditions shown in FIG. 11, a file name of image data, a filter name and a filter ID through which the image data pass, and a condition set in each filter are related to each other based on the keeping table 10, the edit condition table 12, and the print condition table 14. Therefore, the file name (bibliographic data), the edit condition, and the print condition (output condition) of the image data are related to each other.

The document register filter 133b of this embodiment stores and retains the output conditions and the image data with a set file name in the storage device HDD through the bibliographic data management service 135. In this embodiment, therefore, the output conditions of the image data can be read out as well when reading out the stored image data. Thus, the image data reflecting the conditions set in each filter when outputting the image data can be restored in this embodiment.

Note that the description has been made on the case where the image data are outputted only from the print filter 133a, however, the invention is not limited to this. In the case where there are plural output filters 133 which output the same image data, the paths through which the image data are outputted from the output filters 133 may be stored as output conditions.

Figure 12:
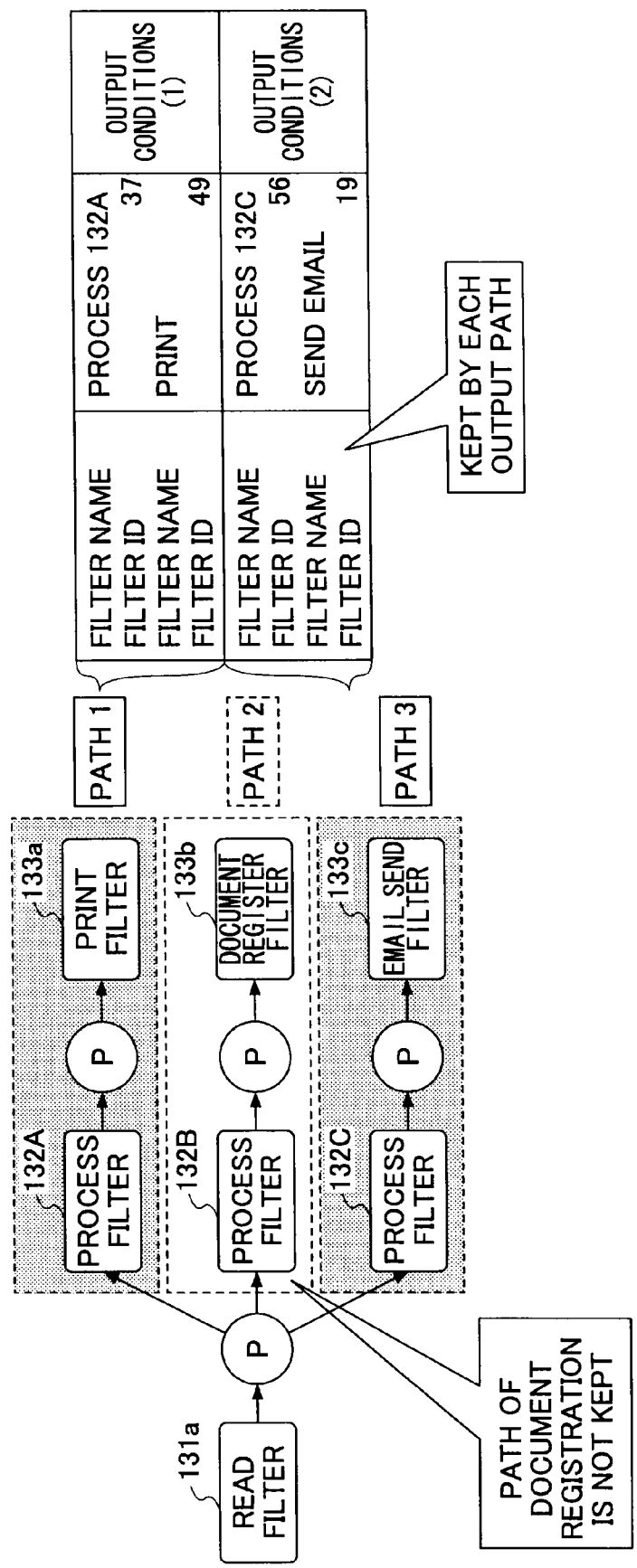
FIG. 12 is a diagram showing the output conditions when image data are outputted through plural output filters.

FIG. 12 shows the output conditions in the case where the image data are outputted from plural output filters.

FIG. 12 shows the case where the image data read out by the read filter 131a are outputted from the print filter 133a and the email send filter 133c.

For example, in a path through which the image data are outputted from the print filter 133a, the edit condition set in the process filter 132A and the print condition set in the print filter 133a are stored as output conditions (1). In a path through which the image data are outputted from the email send filter 133c, the edit condition set in the process filter 132C and the email send condition set in the email send filter 133c are stored as output conditions (2).

In this manner, output conditions of each path can be retained when there are plural output paths of the image data in the image processing apparatus 100A of this embodiment.

In this embodiment, therefore, the image data can be restored based on the output conditions of each path.

Hereinafter described is the restoring of the image data in the image processing apparatus 100A of this embodiment. In this embodiment, the image data start being re-outputted when the image data to be re-outputted are selected.

Figure 14A:
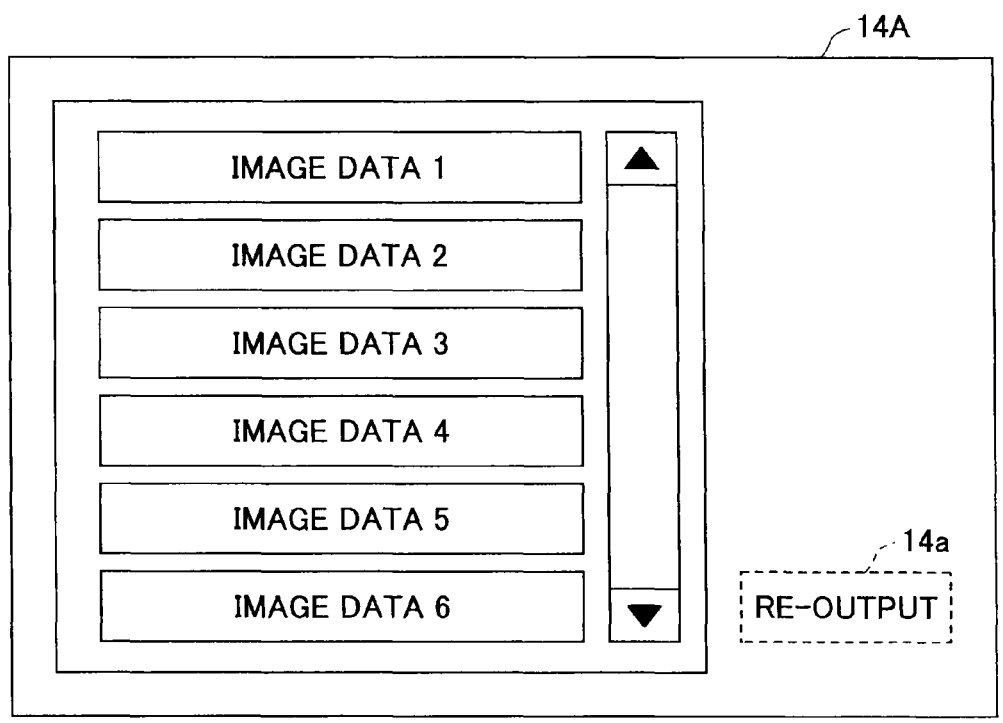
FIGS. 14A and 14B are diagrams showing examples of a display of an operating device of the image processing apparatus of the second embodiment.

First, a selecting process of the image data to be re-outputted in the image processing apparatus 100A of this embodiment is described with reference to FIGS. 13 and 14. In this embodiment, the image data selected from the image data stored in the storage device HDD can be re-outputted.

FIG. 13 is a sequence diagram showing a selecting process of the image data to be re-outputted in the image processing apparatus 100A of Embodiment 2. FIG. 14 shows an example of a display of the operating device included in the image processing apparatus 100A of Embodiment 2.

When an instruction to select the image data to be re-outputted in the read-out filter 131ba of the read-out UI 131b is made through the operating device (S1301), the read-out UI 133ba sends the selection instruction to the read-out logic unit 133bb.

In the image processing apparatus 100A of this embodiment, when the instruction to re-output the image data is received through the operating device, all the image data stored in the storage device HDD may be displayed. An operations display 14A shown in FIG. 14A listing all the stored image data is displayed on the operating device. Note that a re-output instruction button 14a to re-output the image data is not visible on the operations display 14A since the image data to be re-outputted have not been selected.

In FIG. 13, when the image data to be re-outputted are selected, a read-out logic unit 131bb searches for the selected image data in the storage device HDD by using the bibliographic data management service unit 135 (S1303). When the image data are found, the read-out logic unit 131bb compares the image data with the related output conditions (S1304). The read-out logic unit 131bb determines if the set output conditions include the re-output of the image data to be re-outputted (S1305).

In the case where the output conditions including the re-output of the image data are set in step S1305, the read-out logic unit 131bb advises the read-out UI 131ba about it (S1306). The read-out UI 131ba updates the operations display 14A of the operating device so that a re-output instruction can be made (S1307).

Figure 14B:
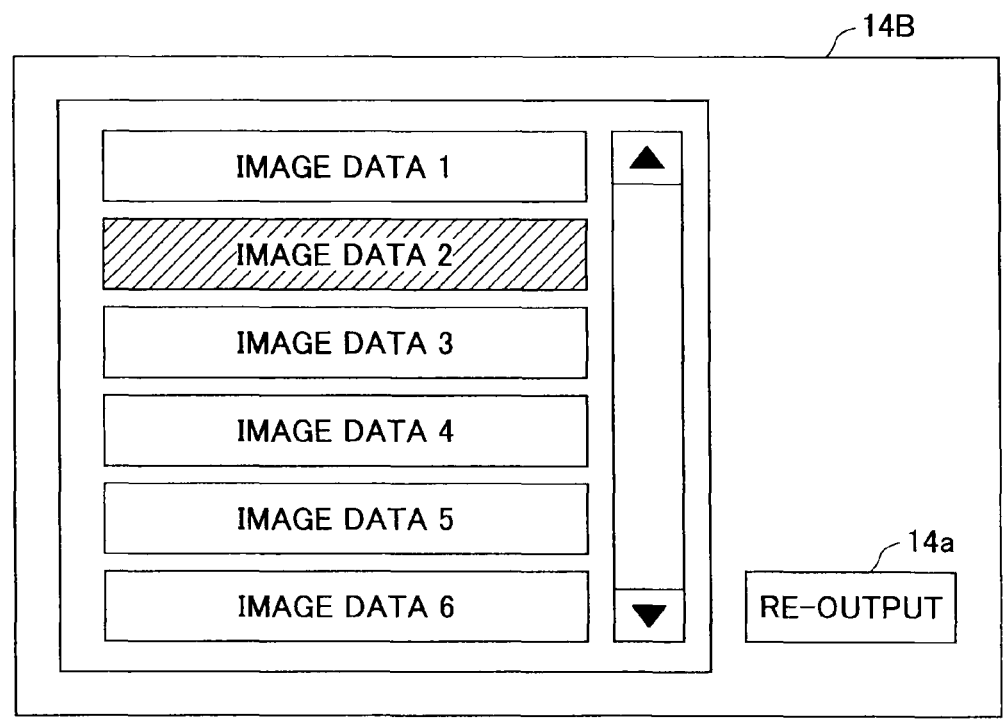

The operations display 14B shown in FIG. 14B indicates that the re-output instruction can be made. In the operations display 14B, an image data set 2 is selected as an object to be re-outputted. As the image data set 2 can be re-outputted in the example shown here, the re-output instruction button 14a to generate a re-output instruction of the image data set 2 is visible. Pressing (or touching) the re-output instruction button 14a on the operations display 14B starts the re-output process of the selected image data set 2.

In this manner, the image data as an object to be re-outputted are selected in this embodiment.

With reference to FIGS. 15 and 16, restoring the output conditions of the image data as an object to be re-outputted is described. FIG. 15 shows another example of a display of the operating device included in the image processing apparatus 100A of Embodiment 2. FIG. 16 is a sequence diagram showing the restoring process of the output conditions in the image processing apparatus 100A of Embodiment 2.

Figure 15A:
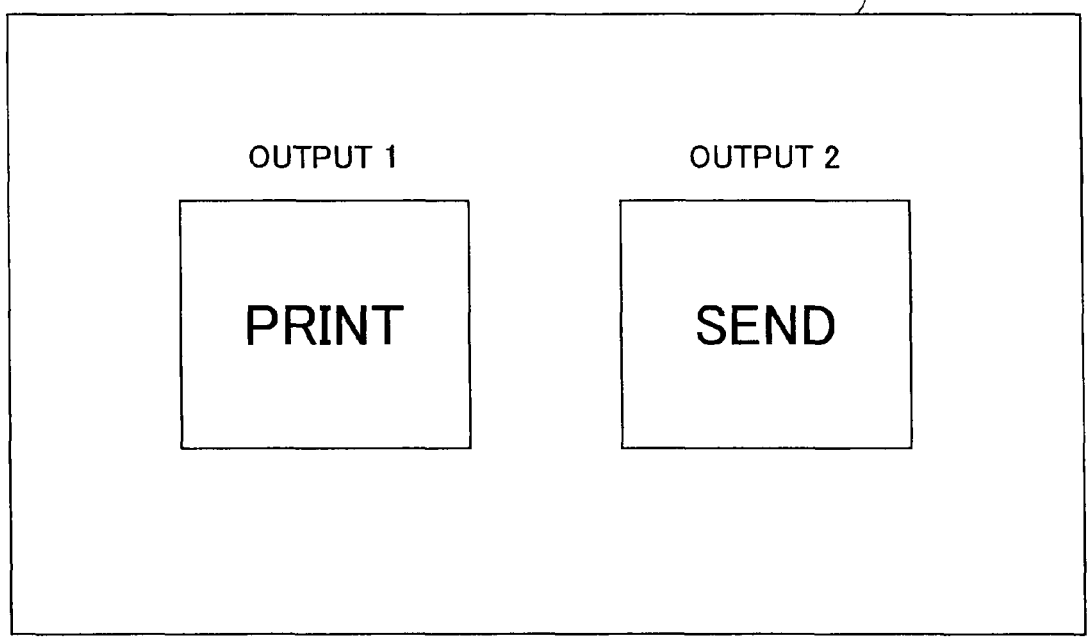
FIGS. 15A and 15B are diagrams showing other examples of the display of the operating device of the image processing apparatus of the second embodiment.

When the re-output instruction for the selected image data is made, the operating device of the image processing apparatus 100A of this embodiment displays an operations display 15A showing output paths capable of being restored as shown in FIG. 15A. The operations display 15A shows that it is possible to restore a path to re-output the image data from the print filter 133a and a path to re-output the image data from the email send filter 133c. When the operations display 15A is displayed on the operating device, the image processing apparatus 100A starts the restoring process of the output conditions shown in FIG. 16.

FIG. 16 shows the case where the image data are re-outputted from the print filter 133a among the output paths displayed; the operations display 15A shown in FIG. 15A.

When the output conditions of the image data to be re-outputted are displayed on the operating device, the image processing apparatus 100A instructs the read-out UI 131ba to expand the output conditions (S1601). The read-out UI 131ba sends this instruction to the read-out logic unit 131bb (S1602).

The read-out logic unit 131bb advises the activity logic unit 134Ab about receiving the instruction to expand the output conditions (S1603). The activity logic unit 134Aa restores the output condition of each filter based on the output conditions compared when searching for the image data to be re-outputted (see S1304 in FIG. 13).

In FIG. 16, the activity logic unit 134Ab restores the edit condition of the process filter 132A from the output conditions. The activity logic unit 134Ab once again causes the process logic unit 132Ab to restore the edit condition related to the filter ID of the process filter 132A included in the output conditions (S1604). Receiving the instruction to restore the edit condition from the activity logic unit 134Ab, the process logic unit 132Ab checks the edit condition related to the filter ID of the process filter 132A stored in the storage device HDD through the data management unit 153 (S1605). Then, the process logic unit 132Ab sets the edit condition checked in the storage device HDD and advises the process UI 132Aa that the edit condition is changed (S1606).

Subsequently, the activity logic unit 134Ab restores the print condition of the print filter 133a from the output conditions. The activity logic unit 134Ab causes the print logic unit 133ab to restore the print condition related to the filter ID of the print filter 133a included in the output conditions (S1607). Receiving the instruction to restore the print condition from the activity logic unit 134Ab, the print logic unit 132ab checks the print condition related to the filter ID of the print filter 133a stored in the storage device HDD through the data management unit 153 (S1608). Then, the print logic unit 133ab sets the print condition checked in the storage device HDD and advises the print UI 133aa that the print condition is changed (S1609).

Figure 15B:
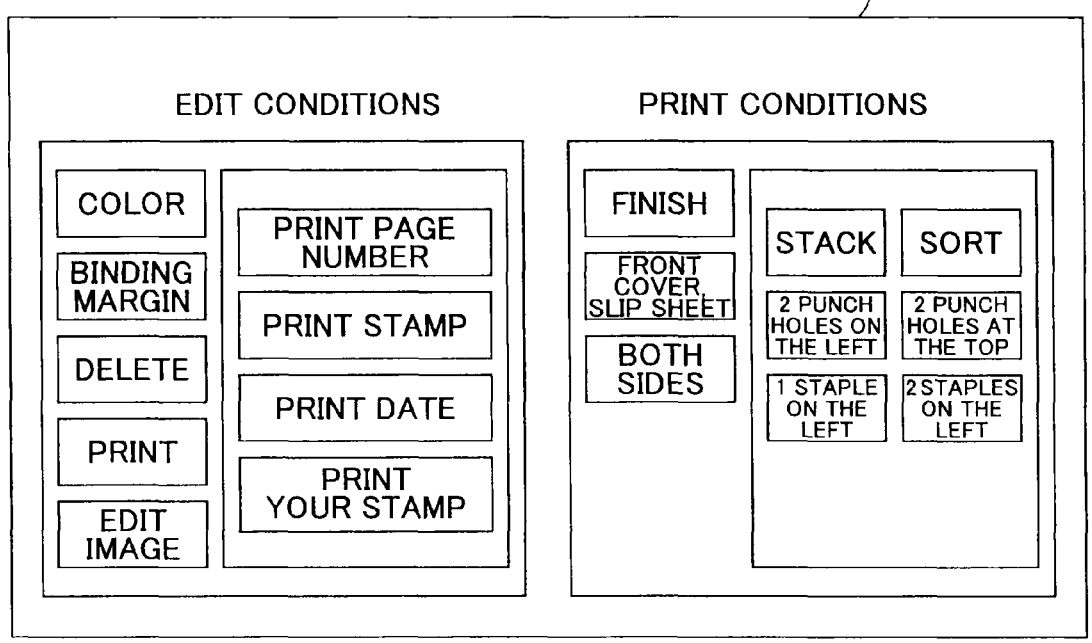

In the image processing apparatus 100A of this embodiment, the output conditions are restored as described above. When the output condition of each filter is restored in the image processing apparatus 100A, the operations display 15B shown in FIG. 15B is displayed on the operating device. The operations display 15B displays the edit conditions restored in the process filter 132A and the print conditions restored in the print filter 133a.

When the output conditions are restored and the condition of each filter is set, jobs to be executed in the filters are generated by the activity unit 134A and a re-output process of the image data is performed in the image processing apparatus 100A of this embodiment. The re-output process of the image data after the jobs are generated to be executed in the filters is as shown in FIG. 6.

According to this embodiment, the output conditions set for each output path of the image data are related to the image data when the image data are retained. Therefore, the image data reflecting the output conditions can be re-outputted by only reading out the image data to be re-outputted and the output conditions related to the image data. According to this embodiment, an image processing apparatus can be provided which can maintain image data in a state capable of being re-outputted and can easily re-output the stored image data without spoiling the freedom of filter combination.

Figure 17:
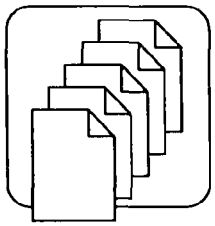
FIG. 17 is a diagram showing an example of an operations display displayed on the operating device.

The image processing apparatus 100A of this embodiment can select the output condition to retain when storing the image data with the output conditions. In this embodiment, for example, an operations display 17A shown in FIG. 17 may be displayed on the operating device before the keeping process of the output conditions shown in FIG. 9 starts. FIG. 17 shows an example of the operations display 17A displayed on the operating device.

The operations display 17A shows the case where there are two output paths of the image data. One path is a print path where the image data are to be outputted from the print filter 133a and the other path is an email send path where the image data are to be outputted from the email send filter 133c. In the operations display 17A in this case, the user can select to keep both the output conditions of the print path and those of the email send path, keep one of these, or keep none of these. In the image processing apparatus 100A, the image data can be related and retained with the output conditions selected on the operations display 17A. Thus, the user can retain only the necessary output conditions.

Figure 18:
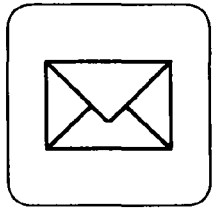
FIG. 18 is a diagram showing another example of an operations display displayed on the operating device.

The image processing apparatus 100A of this embodiment can restore only the selected output conditions from the stored conditions when restoring the output conditions. For example, in this embodiment, the operations display 18A shown in FIG. 18 may be displayed on the operating device before the restoring process of the output conditions shown in FIG. 16 starts. FIG. 18 shows another example of an operations display 18A displayed on the operating device.

The operations display 18A shows the case where there are two output conditions related to one image data set. One output condition is set in the print path where the image data are to be outputted by the print filter 133a and the other output condition is set in the email send path where the image data are to be outputted by the email send filter 133c. In this embodiment, only the output conditions selected on the operations display 18A can be restored.

Note that when the output conditions to be restored are selected on the operations display 18A, only the data of the selected output condition may be displayed on the operations displays 15A and 15B shown in FIGS. 15A and 15B, respectively.

Moreover, when re-outputting the image data through plural paths, a judgment by a human can be made whether the image data are to be re-outputted through each of the selected paths or not.

When the idea of pipes & filters is applied as in the image processing apparatus 100A of this embodiment, filters can be easily installed or uninstalled. Therefore, when the image data are to be re-outputted, there is a possibility that a filter set as an output condition has been uninstalled.

Figure 19:
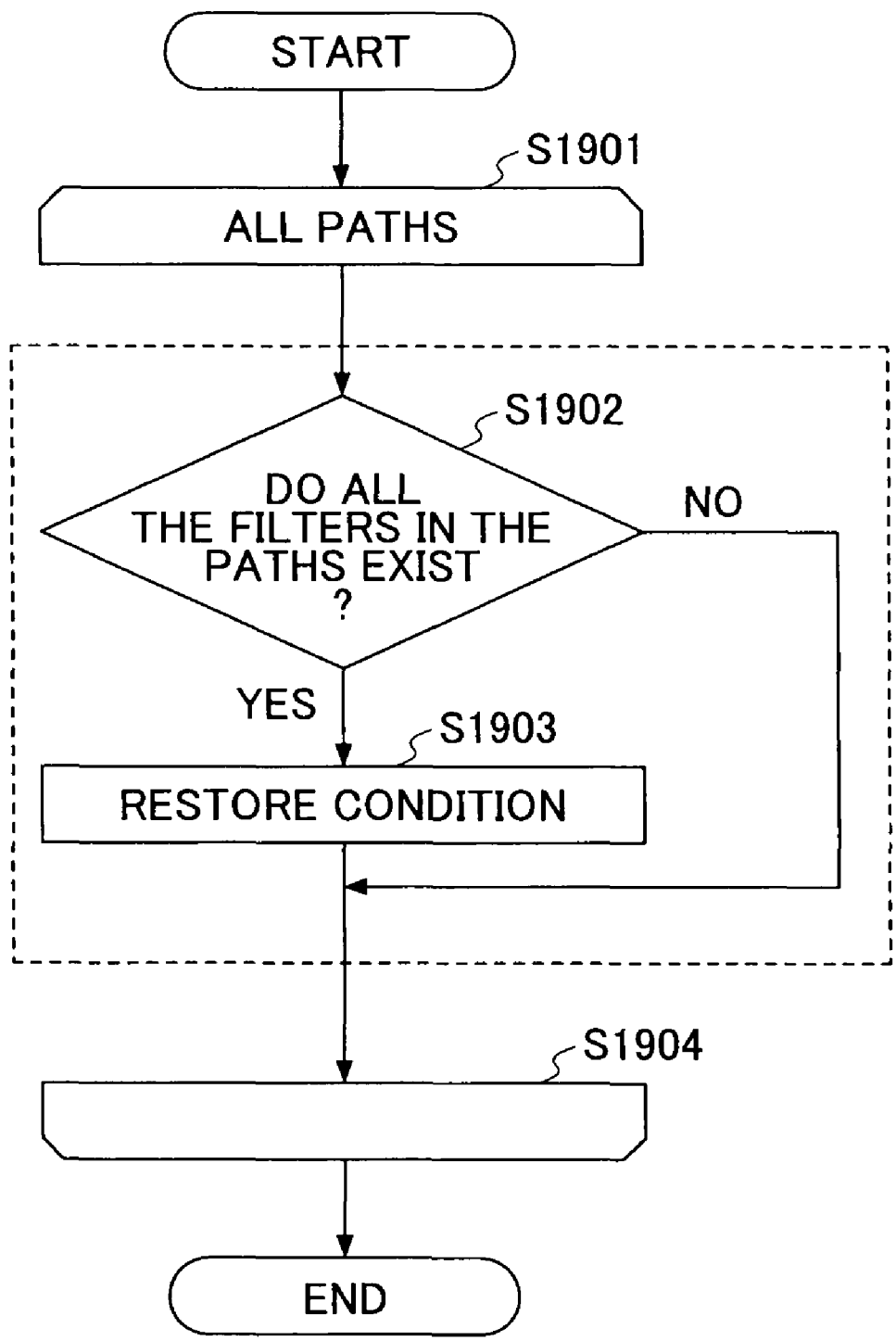
FIG. 19 is a flowchart showing a process to determine existence of a filter in the second embodiment.

In the image processing apparatus 100A of this embodiment, a determination is made whether all the filters set as the output conditions exist when outputting the image data. FIG. 19 is a flowchart describing a process to determine the existence of the filters of Embodiment 2.

Reading out the output conditions set in all the paths requested to re-output the image data (S1901), the image processing apparatus 100A determines whether all the filters included in the output conditions of all the paths exist (S1902). When all the filters included in the output conditions in all the paths do not exist (NO in step S1902), the output conditions are not restored and the image data are not re-outputted.

The image processing apparatus 100A of this embodiment includes an application management unit (not shown) where the activity unit and the filters are registered. The application management unit is incorporated in the application logic layer 130A and manages the activity unit and the filters. The activity unit and the filters are registered in the application management unit when the image processing apparatus 100A is activated and the registration is deleted from the application management unit when the power of the image processing apparatus 100A is shut down. In this embodiment, therefore, the determination can be made whether all the filters included in the output conditions exist by searching the application management unit when activating the image processing apparatus 100A.

When all the filters included in the output conditions in all the paths are determined to exist in step S1902, the image processing apparatus 100A performs the restoring process of the output conditions (S1903). The restoring process of the output conditions is performed as described above. In this embodiment, the processes of S1902 and S1903 are performed for each output path of the image data (S1904).

In this manner, the image data are restored only when the restoration is possible with settings similar to the output conditions of storing the image data. Therefore, the output conditions can be restored without mistakes and an improper output such as re-outputting the image data with wrong conditions can be prevented.

When the output condition is changed during the re-output of the image data in the image processing apparatus 100A of this embodiment, the user can select whether to keep the changed output conditions.

The case where the output condition is changed during the re-output is, for example, the case where a part of the output conditions is canceled while continuing the output. For a specific example, for example, when a re-output of the image data is performed with the output conditions to perform a staple process after printing by the image processing apparatus 100A, the staple process only is temporarily cancelled as the staples run out.

Figure 20:
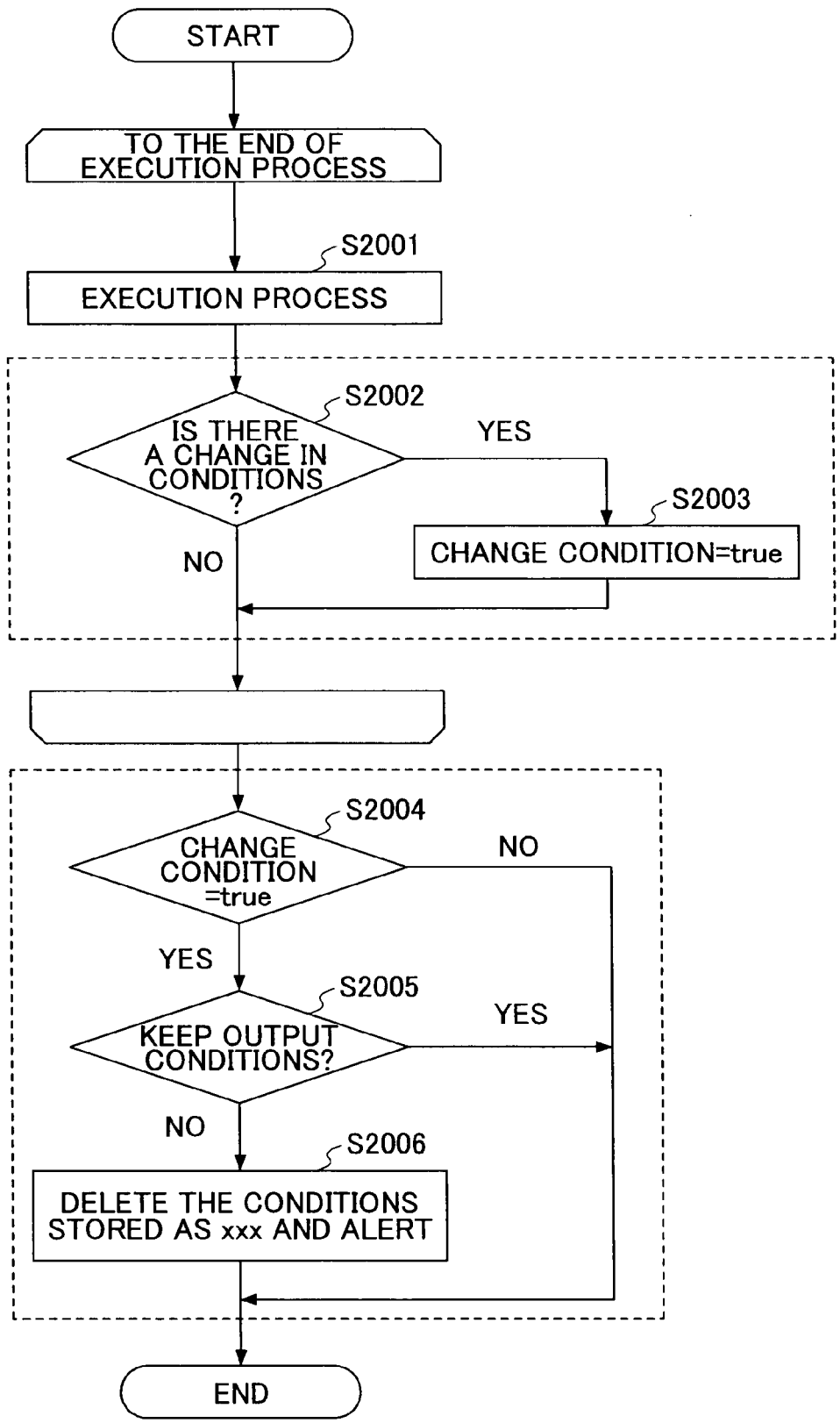
FIG. 20 is a flowchart showing an operation when there is a change in output conditions in the image processing apparatus of the second embodiment.

FIG. 20 is a flowchart showing an operation when the output condition of the image processing apparatus 100A of Embodiment 2 is changed.

When the output process of the image data starts to be executed in the image processing apparatus 100A (S2001), the image processing apparatus 100A determines whether there is a change in the output conditions during execution of the process (S2002). The change in the output conditions here means a change of a setting for a filter in a path through which the image data are to be outputted, for example. To be specific, there are examples such as a change in an edit setting of the process filter 132A and a change in a print setting in the print filter 133a. When there is a change in the output conditions in step S2002, the image processing apparatus 100A sets a flag signaling that there is a change in the output conditions (S2003).

Figure 21:
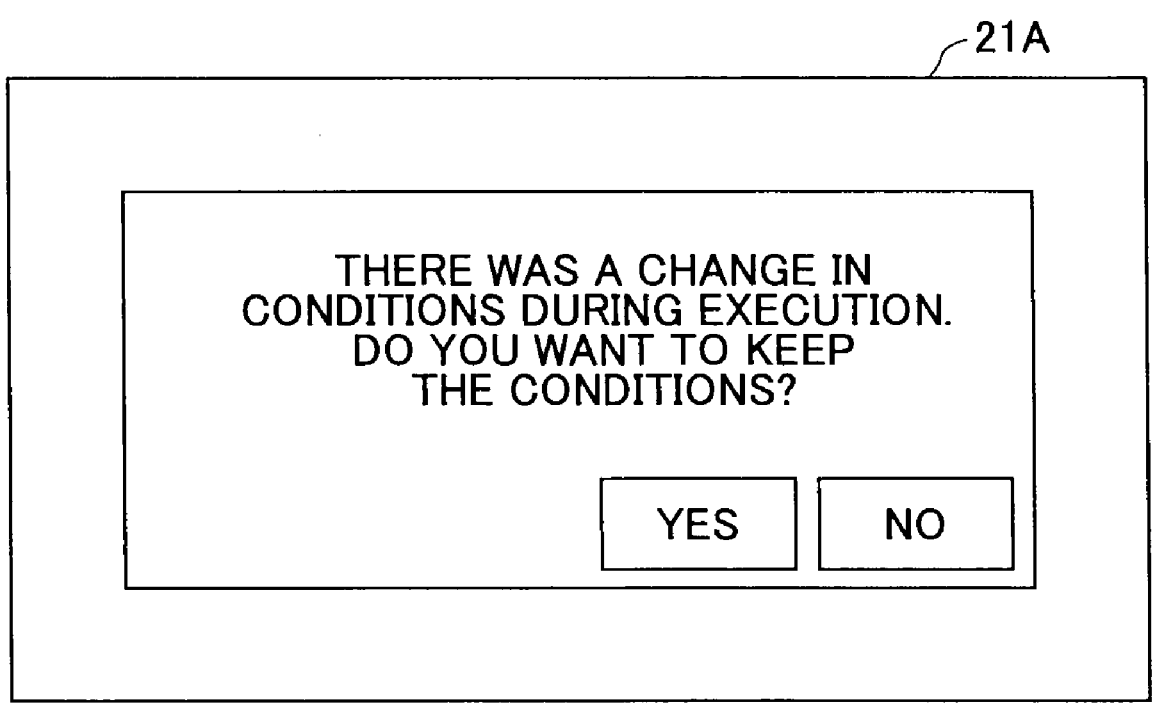
FIG. 21 is a diagram showing an example of an operations display asking whether to keep the changed output conditions.

Subsequently, the image processing apparatus 100A determines whether the flag of the change in the output conditions is set when storing the image data (S2004). When there is a flag of the change in the output conditions set in step S2004, the image processing apparatus 100A displays an operations display 21A on the operating device asking whether to keep the changed output conditions (S2005). FIG. 21 shows an example of the operations display 21A asking whether to keep the changed output conditions.

In FIG. 20, when the user selects to keep the changed output conditions on the operations display 21A in step S2005, the image processing apparatus 100A retains the changed output conditions.

In step S2005, when the user selects not to keep the changed output conditions, the image processing apparatus 100A deletes the settings set in the filters where the output conditions have been changed, and displays a message of deletion on the operations display 21A of the operating device (S2006).

In this manner, when there is a change in the output conditions during the re-output process of the image data, the user can select whether to keep the changed output conditions in this embodiment. Therefore, it is possible to prevent an improper operation cancelling a part of the output conditions by mistake during the re-output process of the image data.

In this embodiment, even when a part of the restored output conditions cannot be executed when re-outputting the image data, the re-output can be performed by executing the other output conditions.

To be specific, a case where a part of the output conditions cannot be executed is, for example, where staples are not supplied in the image processing apparatus 100A when a staple process after printing is set as an output condition. In this case, the staple process as a part of the output conditions cannot be executed.

Figure 22:
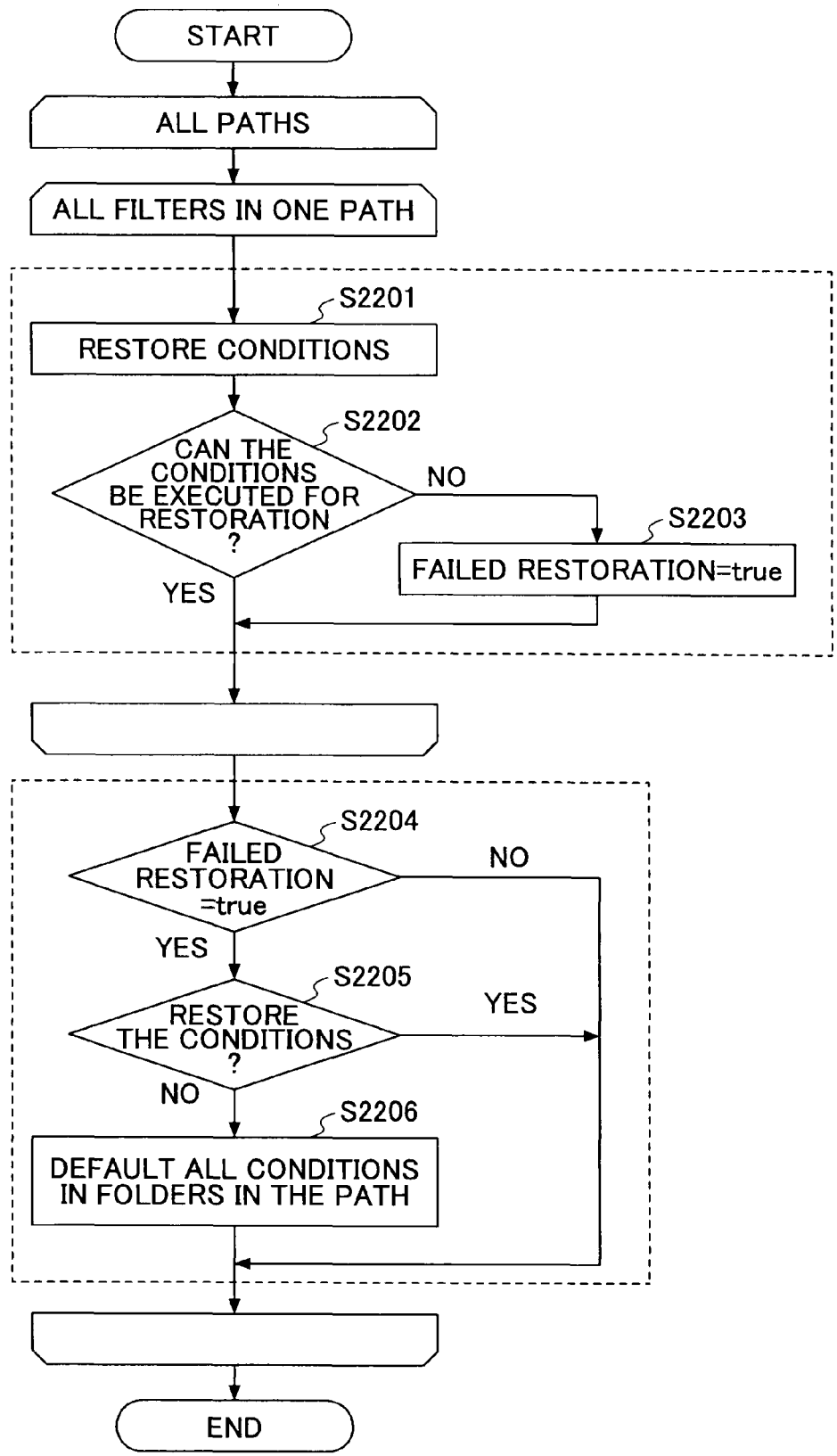
FIG. 22 is a flowchart showing an operation when a part of output conditions cannot be executed in the image processing apparatus of the second embodiment.

In the image processing apparatus 100A of this embodiment, the output conditions can be executed except for the output conditions which cannot be executed. FIG. 22 is a flowchart showing an operation of the case when a part of the output conditions cannot be executed in the image processing apparatus 100A of Embodiment 2.

When the output conditions are restored (S2201), the image processing apparatus 100A determines whether the re-output can be executed based on the restored output conditions (S2202). In the case where there is an output condition which cannot be executed in step S2202, the image processing apparatus 100A sets a flag of impossible execution (S2203). The image processing apparatus 101A performs the processes of S2201 through S2203 on all the filters of each output path.

Figure 23:
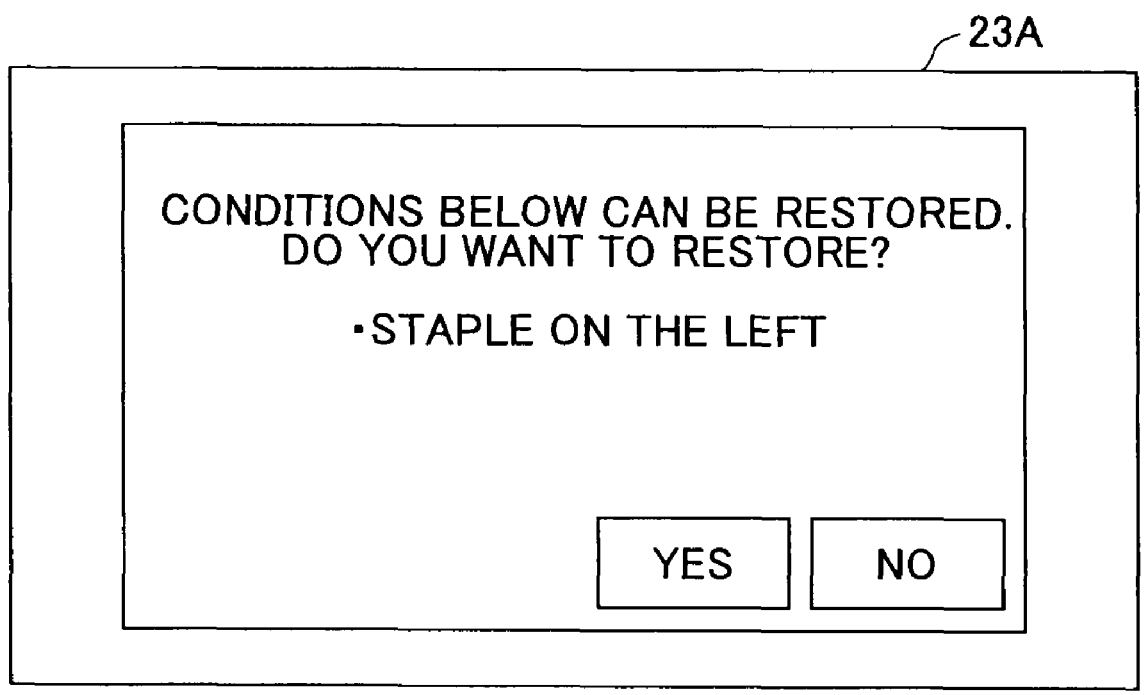
FIG. 23 is a diagram showing an example of an operations display asking whether to restore the output conditions.

Next, the image processing apparatus 100A determines whether a flag signaling that the output condition cannot be executed is set (S2204). When there is a flag in step S2204, the image processing apparatus 100A displays on the operating device an operations display 23A as shown in FIG. 23 asking a question whether to restore the output condition which cannot presently be executed (S2205). The image processing apparatus 100A performs the processes of S2201 through S2206 on all the output paths.

In this manner, even when a part of the output conditions cannot be executed, the other output conditions can be executed to perform a re-output in the image processing apparatus 100A of this embodiment. In the image processing apparatus 100A of this embodiment, it is possible to retain the output condition which cannot be executed. Therefore, the output conditions can be retained without a change when the impossible execution problem can be easily solved; for example, cases where no staples are supplied, no printing paper is supplied in a paper tray, and the like. In such cases, the impossible execution problem can be solved by supplying staples or printing paper.

In the image processing apparatus 100A of this embodiment, the image data before processing by the process filter 132, that is the image data right after the output from the input filter 131A, can be stored as well.

Figure 24:
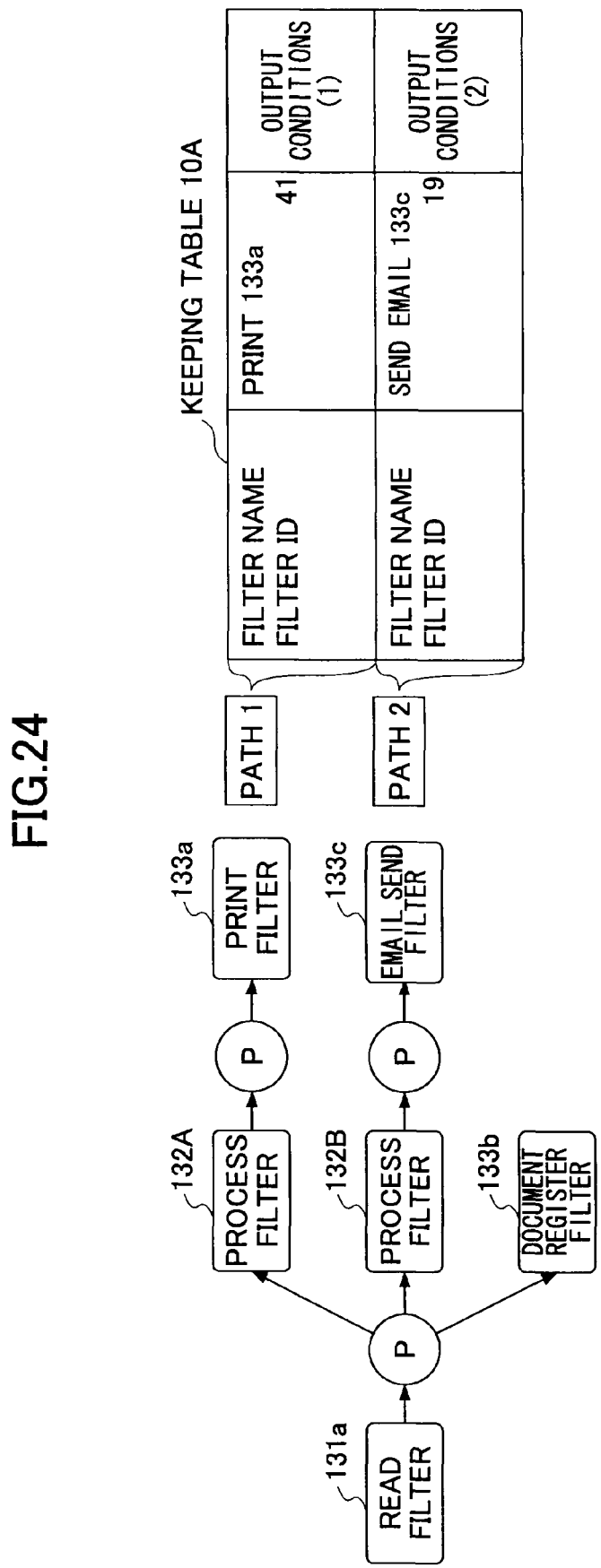
FIG. 24 is a diagram showing an operation when image data before processing are retained in the image processing apparatus of the second embodiment.

FIG. 24 shows an operation to store the image data before processing in the image processing apparatus 100A of Embodiment 2.

FIG. 24 shows the case where the image data are outputted from the print filter 133a and the email send filter 133c.

In the image processing apparatus 100A, the activity unit 134A connects the document register filter 133b in a subsequent stage of the read filter 131a when the image data before processing are set to be retained. The document register filter 133b reads out and stores the image data read by the read filter 131b.

At this time, the document register filter 133b is required to store only the conditions set in the print filter 133a and the email send filter 133c as the output filters through which the image data are to be outputted. Therefore, in the example shown in FIG. 24, the document register filter 133b stores in the keeping table 100A the filter names and filter IDs of the print filter 133a and the email send filter 133c as the output filters through which the image data are to be outputted. The document register filter 133b forms a print condition table (not shown) set for the print filter 133a and an email send condition table (not shown) set for the email send filter 133c, which are related to the image data and stored.

Thus, in this embodiment, image data before being processed can be maintained as it is.

In this embodiment, when re-outputting the image data stored before being processed, either of the read-out filter 131b and the output filter 133 may be connected without interposing the process filter 132. For example, the email send filter 133c is connected in a subsequent stage of the read-out filter 131b. In this case, the image data read out from the storage device HDD by the read-out filter 131b may be outputted from the output filter 133.

Further, the procedures to realize the various functions in the embodiments may be stored in a memory medium as a program which can be read and executed by computers.

Figure 25:
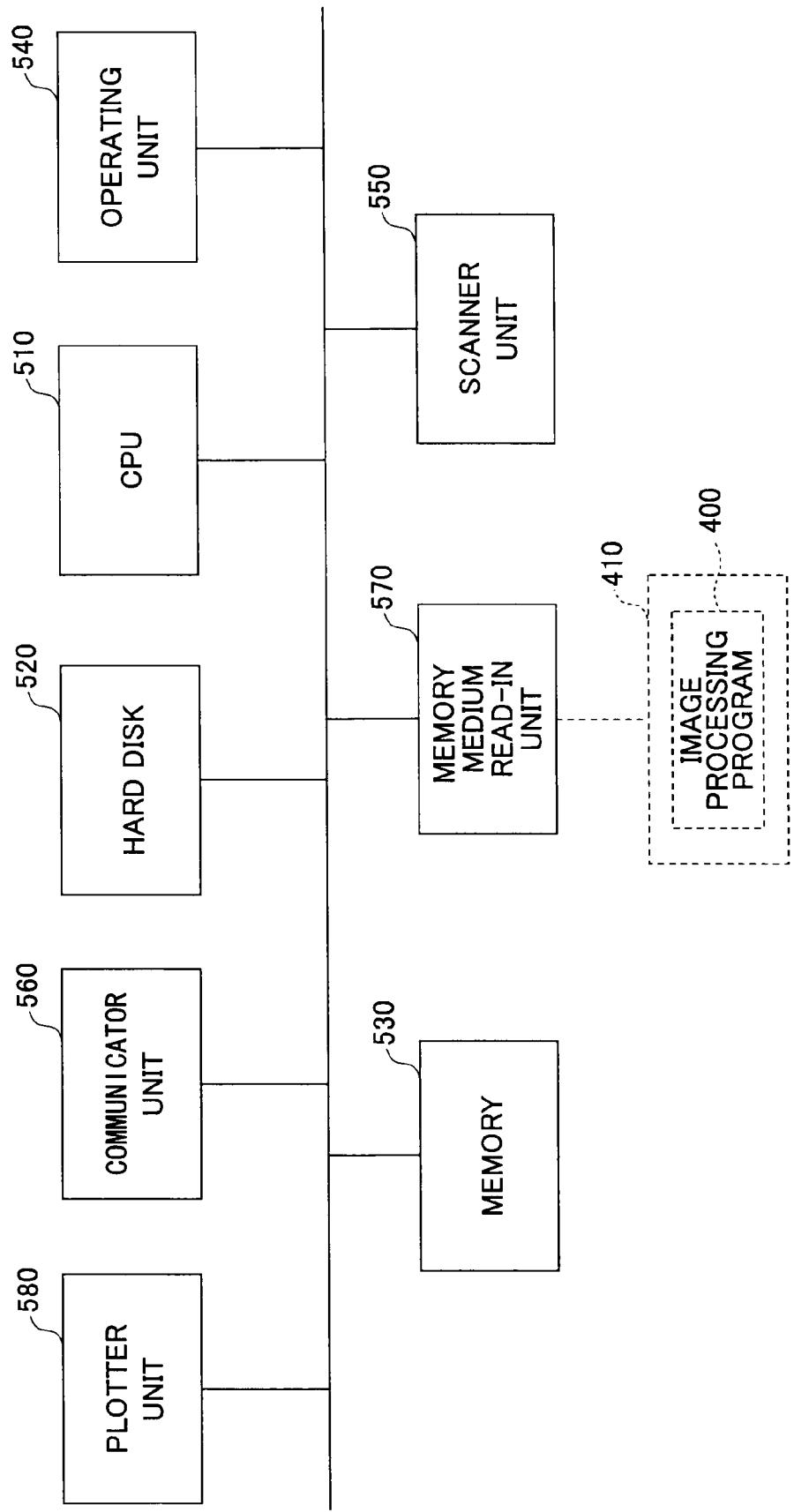
FIG. 25 is a diagram showing a memory medium storing a program to realize various functions described in each embodiment.

FIG. 25 shows a memory medium 410 storing a program 400 which realizes various functions of the embodiments. When the program 400 stored in the memory medium 410 is read in the image processing apparatus 100A and executed, the functions described in the embodiments can be realized.

The image processing apparatus 100A, for example, includes a CPU 510, a hard disk 520, a memory 530, an operating unit 540, a scanner unit 550, a communicator unit 560, a memory medium read-in unit 570, and a plotter unit 580. The CPU 510 is an arithmetic processing unit which performs operations and processes executed in the image processing apparatus 100A. The hard disk (HDD) 520 is a storage device which stores data, which are an application operating in the image processing apparatus 100A, data formed by this application, and the like. The storage device described in this embodiment may be the hard disk 520. The memory 530 holds various set values related to the image processing apparatus 100A, operating results of the CPU 510, and the like.

The operating unit 540 is an operations panel or the like having a display function, at which operations, display of operating states, and the like of the image processing apparatus 100A are performed. Note that the operating device of this embodiment may be the operating unit 540.

The scanner unit 550, which reads in a document to form image data, is formed of a scanner engine, an engine controller, and the like. The communicator unit 560 is a network control unit or the like, through which the image processing apparatus 100A communicates with external devices. The memory medium read-in unit 570 reads in data, programs, and the like stored in various memory media, which is a floppy (registered trademark) disk drive, for example. The plotter 580 is formed of a plotter engine, an engine controller, and the like, which prints out the image data.

The memory medium 410 stores the image processing program 400 which realizes various functions of this embodiment. This image processing program 400 is read in by the memory medium read-in unit 570 and executed by the CPU 510. The memory medium 410 may be, for example, a floppy (registered trademark) disk, a CD-ROM (Compact Disk Read Only Memory), or any medium which can be read by the image processing apparatus 100A. Further, the image processing program 400 may be received by the communicator unit 560 through a network and stored in the hard disk 520 or the like.

Although the invention has been described with respect to specific embodiments for a complete and clear disclosure, the appended claims are not to be thus limited but are to be construed as embodying all modifications and alternative constructions that may occur to one skilled in the art that fairly fall within the basic teachings herein set forth.

This patent application is based on Japanese Priority Patent Application No. 2007-276729 filed on Oct. 24, 2007, the entire contents of which are hereby incorporated herein by reference.

What is claimed is:

1. An image processing apparatus, comprising:
an input unit configured to obtain image data and to perform an input process on the image data to produce input image data;
an input filter configured to control the input process performed by the input unit;
an output unit configured to perform an output process on processed image data;
a first output filter configured to control the output process performed by the output unit;
a process filter connecting between the input filter and the first output filter to control processing of the input image data to produce the processed image data; and
a second output filter configured to control an output process for storing given image data and conditions concerning outputting of the given image data in a storage unit,
wherein said second output filter is coupled to one of the input filter and the process filter in response to receiving an instruction to store the given image data.

2. An image processing apparatus, comprising:
an input unit configured to obtain image data and to perform an input process on the image data to produce an input image data;
a first input filter configured to control the input process performed by the input unit;
an output unit configured to perform an output process on processed image data to produce output image data;
an output filter configured to control the output process performed by the output unit;
a process filter connecting between the first input filter and the output filter to control processing of the input image data to produce the processed image data; and
a second input filter configured to control an input process for reading out given image data stored in a storage unit storing the given image data and conditions concerning outputting of the image data,
wherein said second input filter is coupled to one of the process filter and the output filter in response to receiving an instruction to read out the given image data stored in the storage unit.

3. An image processing apparatus, comprising:
an input unit configured to obtain image data and to perform an input process on the image data to produce an input image data;
a first input filter configured to control the input process performed by the input unit;
an output unit configured to perform an output process on processed image data to produce output image data;
a first output filter configured to control the output process performed by the output unit;
a process filter connecting between the first input filter and the first output filter to control processing of the input image data to produce the processed image data;
a second output filter configured to control an output process for storing given image data and conditions concerning outputting of the given image data in a storage unit, and
a second input filter configured to control an input process for reading out the given image data stored in the storage unit,
wherein said second output filter is coupled to one of the first input filter and the process filter in response to receiving an instruction to store the given image data, and
said second input filter is coupled to one of the process filter and the first output filter in response to receiving an instruction to read out the given image data stored in the storage unit.

4. The image processing apparatus as claimed in claim 3, wherein when there is a change in the conditions concerning outputting of the given image data in the output process for storing the given image data and the conditions concerning outputting of the given image data, said second output filter retains one of the conditions concerning outputting of the given image data before the change and the conditions concerning outputting of the given image data after the change.

5. The image processing apparatus as claimed in claim 4, wherein said second output filter includes an output condition generating unit configured to generate said conditions for each path that the obtained image data pass through to be outputted from the first output filter and a relating unit configured to relate the conditions generated by the output condition generating unit with the given image data.

6. The image processing apparatus as claimed in claim 5, wherein the relating unit is configured to relate the given image data with the output conditions of the selected path among the conditions generated by the output condition generating unit.

7. The image processing apparatus as claimed in claim 3, wherein said second input filter is configured to restore output conditions for the given image data based on the conditions concerning outputting of the given image data read out from the storage unit.

8. The image processing apparatus as claimed in claim 7, wherein said second input filter is configured to restore a condition selected from the conditions concerning outputting of the given image data read out from the storage unit.

9. The image processing apparatus as claimed in claim 8, wherein when there is a condition that cannot be executed in the conditions concerning outputting of the given image data read out from the storage unit, said second input filter is configured to restore one of output conditions excluding the condition that cannot be executed and output conditions including the condition that cannot be executed.

10. The image processing apparatus as claimed in claim 9, wherein the conditions concerning outputting of the given image data read out from the storage unit include conditions set for the first input filter, the process filter, and the first output filter that the obtained image data pass through to be outputted.

\* \* \* \* \*